(12) United States Patent
Ishikawa et al.

(10) Patent No.: US 8,229,258 B2
(45) Date of Patent: Jul. 24, 2012

(54) OPTICAL WAVEGUIDE-TYPE WAVELENGTH DOMAIN SWITCH

(75) Inventors: Hiroshi Ishikawa, Tsukuba (JP); Toshifumi Hasama, Tsukuba (JP); Hitoshi Kawashima, Tsukuba (JP); Kenji Kintaka, Tsukuba (JP); Masahiko Mori, Tsukuba (JP); Hisato Uetsuka, Hitachi (JP); Hiroyuki Tsuda, Yokohama (JP); Keisuke Sorimoto, Yokohama (JP)

(73) Assignees: National Institute of Advanced Industrial Science and Technology, Tokyo (JP); Hitachi Cable, Ltd., Tokyo (JP); Keio University, Tokyo (JP)

( * ) Notice: Subject to any disclaimer, the term of this patent is extended or adjusted under 35 U.S.C. 154(b) by 490 days.

(21) Appl. No.: 12/585,516

(22) Filed: Sep. 16, 2009

(65) Prior Publication Data

US 2010/0067900 A1 Mar. 18, 2010

(30) Foreign Application Priority Data

Sep. 18, 2008 (JP) ................................. 2008-239650

(51) Int. Cl.
G02B 6/26 (2006.01)
G02F 2/00 (2006.01)
H04J 14/00 (2006.01)

(52) U.S. Cl. .................. 385/18; 385/17; 385/3; 385/31; 385/33; 385/11; 398/7; 398/48; 398/79; 398/82; 398/88

(58) Field of Classification Search .................. 385/1, 2, 385/3, 24, 31, 33, 34, 11, 15, 16, 17, 18; 398/79, 82, 88, 7, 48

See application file for complete search history.

(56) References Cited

U.S. PATENT DOCUMENTS 4,926,412 A * 5/1990 Jannson et al. ................. 398/87

(Continued)

FOREIGN PATENT DOCUMENTS

| JP | 2001-116937 A | 4/2001 |
| JP | 2004-239991 A | 8/2004 |
| JP | 2005-526287 A | 9/2005 |
| JP | 2008-203775 A | 9/2008 |

OTHER PUBLICATIONS

Notification of Reason(s) for Refusal dated Dec. 13, 2011, with English translation.

(Continued)

Primary Examiner — Brian Healy
(74) Attorney, Agent, or Firm — McGinn IP Law Group, PLLC

(57) ABSTRACT

An optical waveguide-type wavelength domain switch includes a waveguide-type multi/demultiplexing device laminate comprising three or more laminated waveguide-type multi/demultiplexing devices, a lens system positioned on a demultiplex side of the waveguide-type multi/demultiplexing device laminate, and a reflective optical phase-modulating cell positioned on an opposite side of the waveguide-type multi/demultiplexing device laminate to the lens system. The lens system includes a lens alignment composed of plural lenses in one-to-one correspondence with the waveguide-type multi/demultiplexing devices and having a light-collecting or collimating function in the lens-aligning direction, an image-magnifying optical system having an N:1 (N>1) image-magnifying function arranged on the optical phase-modulating cell side of the lens alignment, an f-f lens (Y) arranged on the optical phase-modulating cell side of the image-magnifying optical system, and having a light-collecting or collimating function in the same direction as the lens-aligning direction of the lens alignment, and an f-f lens (X) having a light-collecting or collimating function in a perpendicular direction to the lens-aligning direction of the lens alignment.

16 Claims, 16 Drawing Sheets

U.S. PATENT DOCUMENTS

| | | |
|---|---|---|
| 6,549,696 B1 | 4/2003 | Uetsuka et al. |
| 6,849,844 B2 * | 2/2005 | Khoury ............... 250/208.1 |
| 7,088,882 B2 | 8/2006 | Ducellier et al. |
| 7,567,736 B2 * | 7/2009 | Ishikawa et al. ............ 385/15 |
| 7,738,152 B2 * | 6/2010 | Butler et al. ............... 359/30 |
| 2004/0151432 A1 | 8/2004 | Tabuchi et al. |
| 2004/0252938 A1 | 12/2004 | Ducellier et al. |
| 2006/0067611 A1 | 3/2006 | Frisken et al. |
| 2008/0298738 A1 * | 12/2008 | Ishikawa et al. ............ 385/3 |
| 2010/0067900 A1 * | 3/2010 | Ishikawa et al. ............ 398/7 |

OTHER PUBLICATIONS

"Design of the Functional Wavelength-Selective Optical Switch Using a Liquid Crystal on Silicon", Proceedings of Meeting of The Japan Societu of Applied Physics and Related Societies, Mar. 27, 2008, vol. $55^{th}$, No. 3, 1238, (with partial English translation).

* cited by examiner

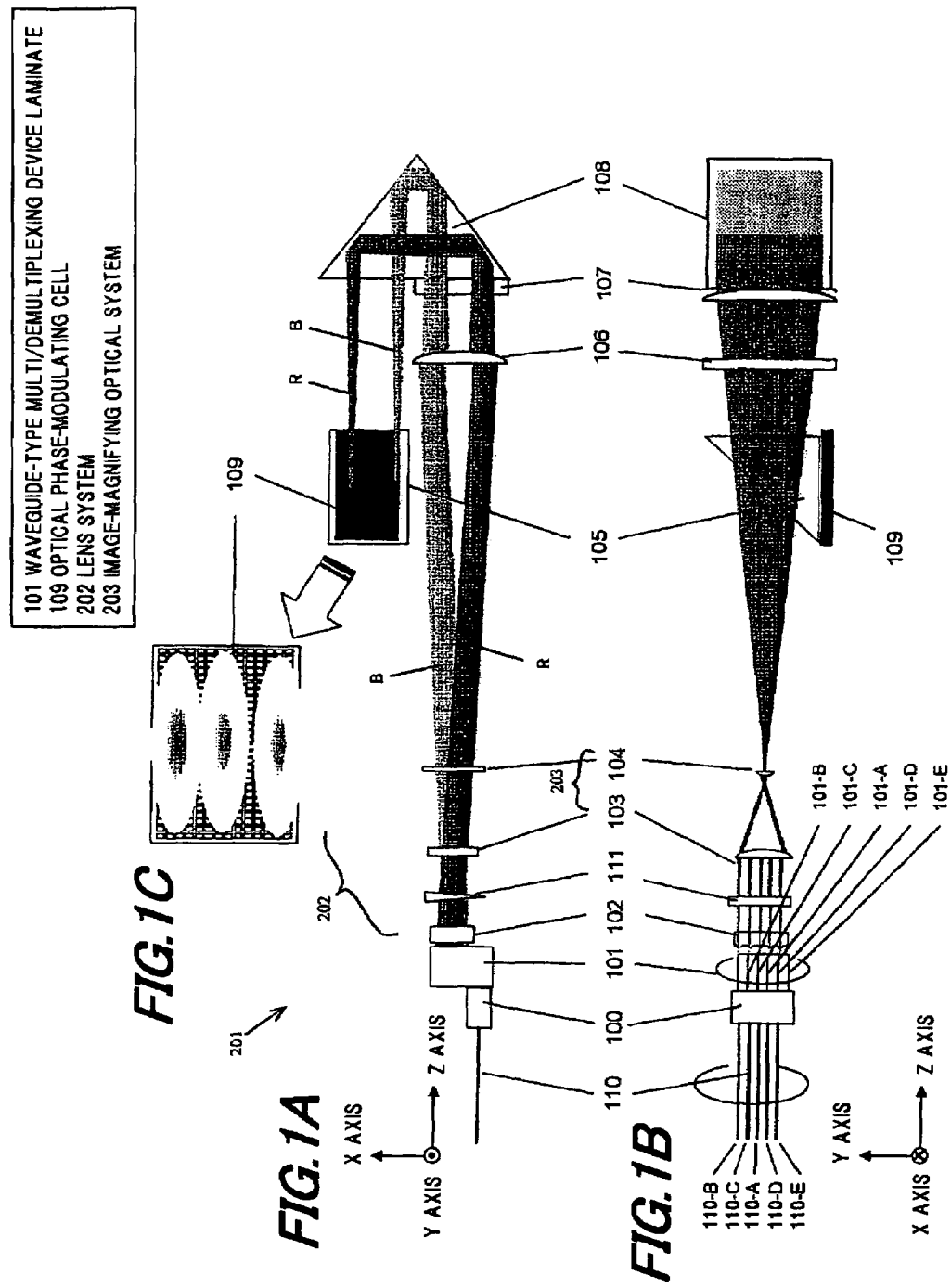

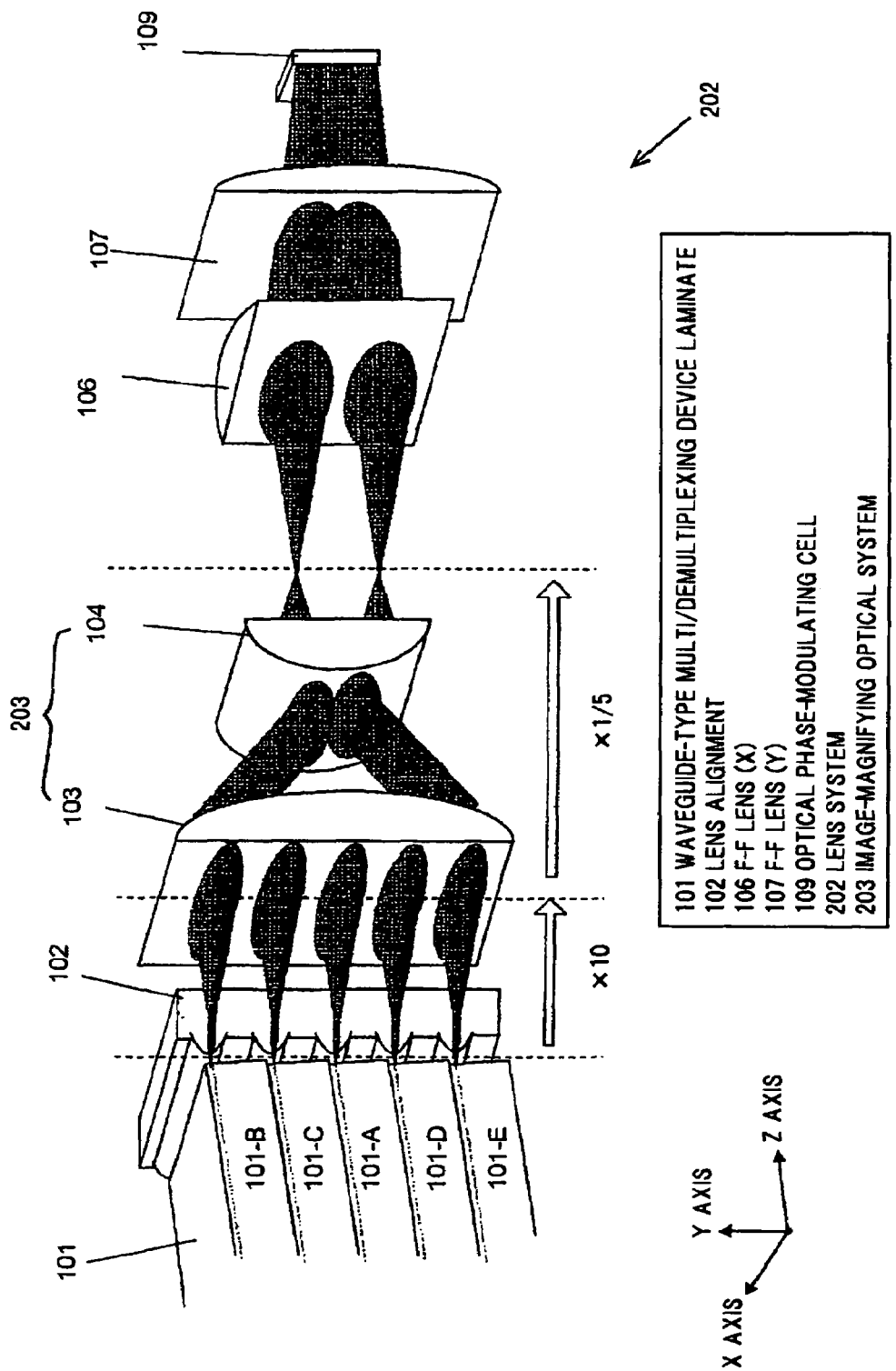

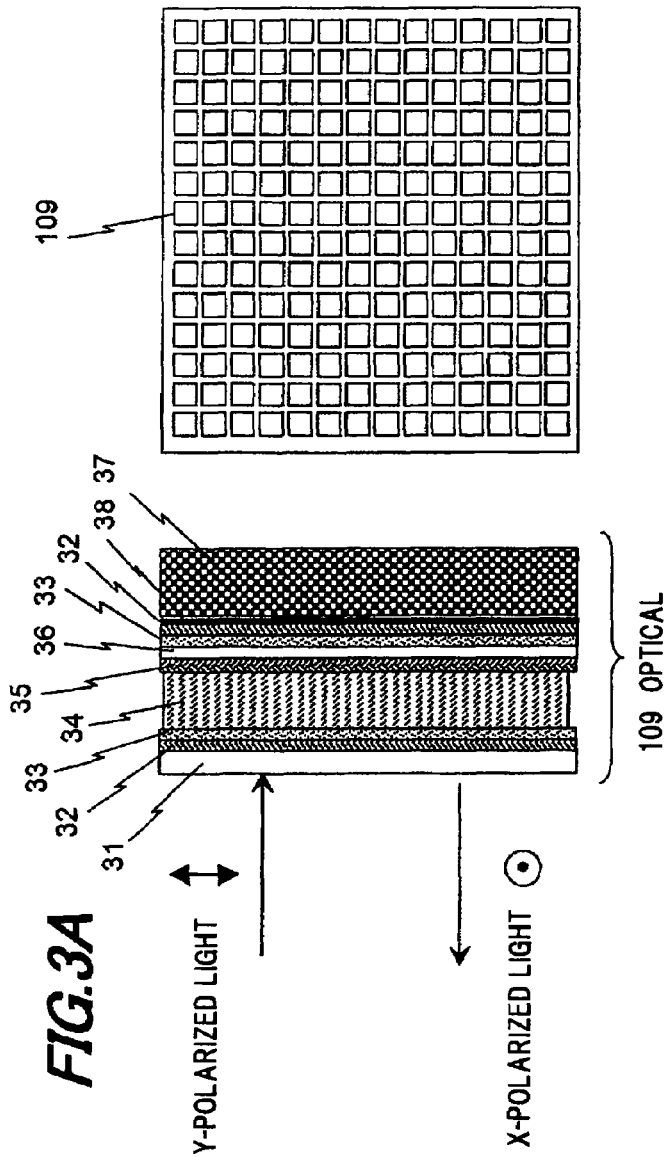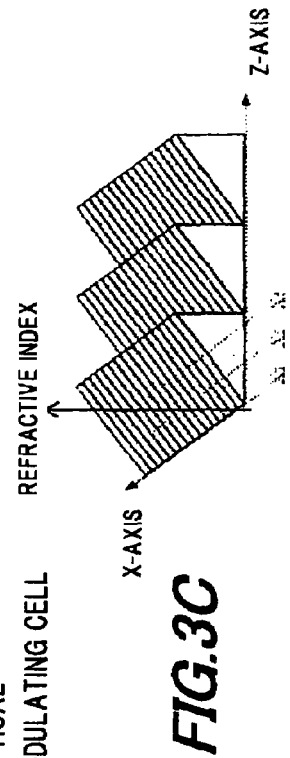

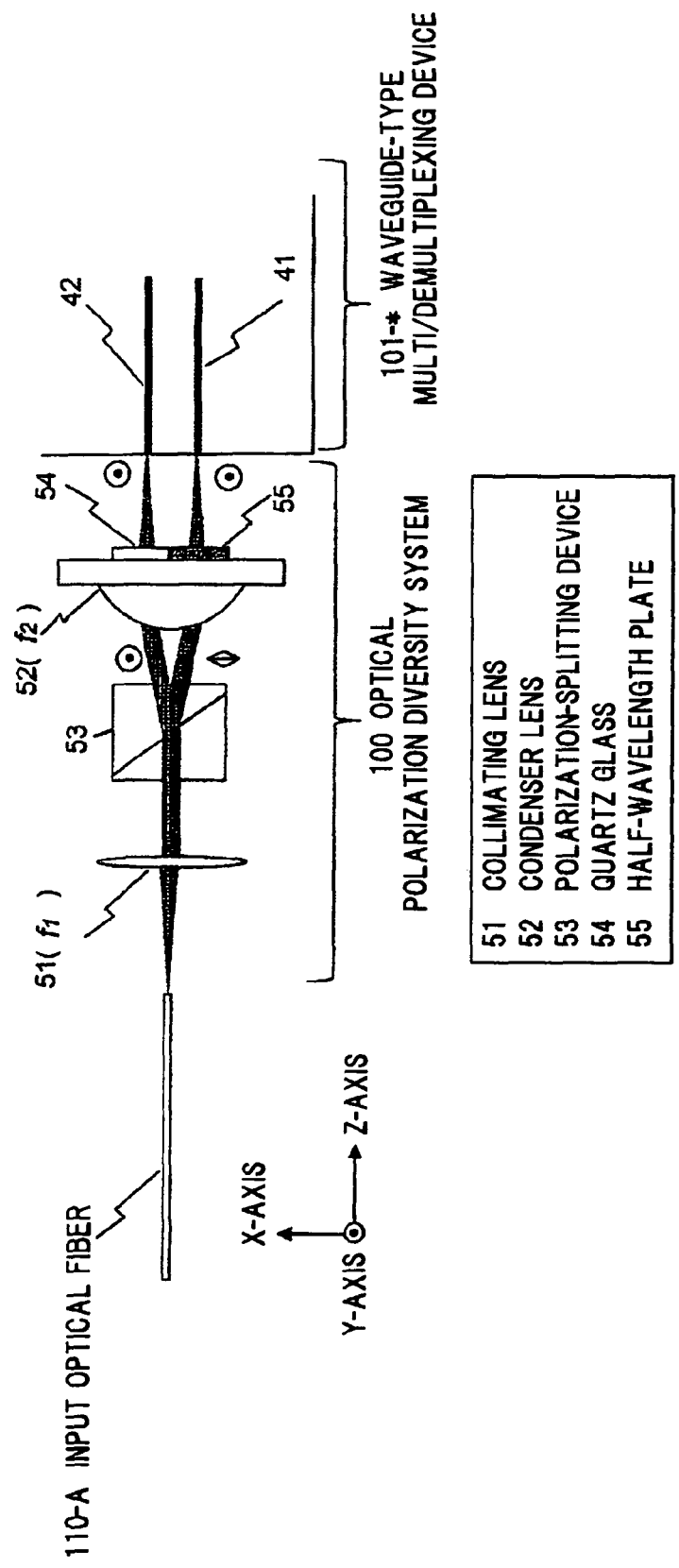

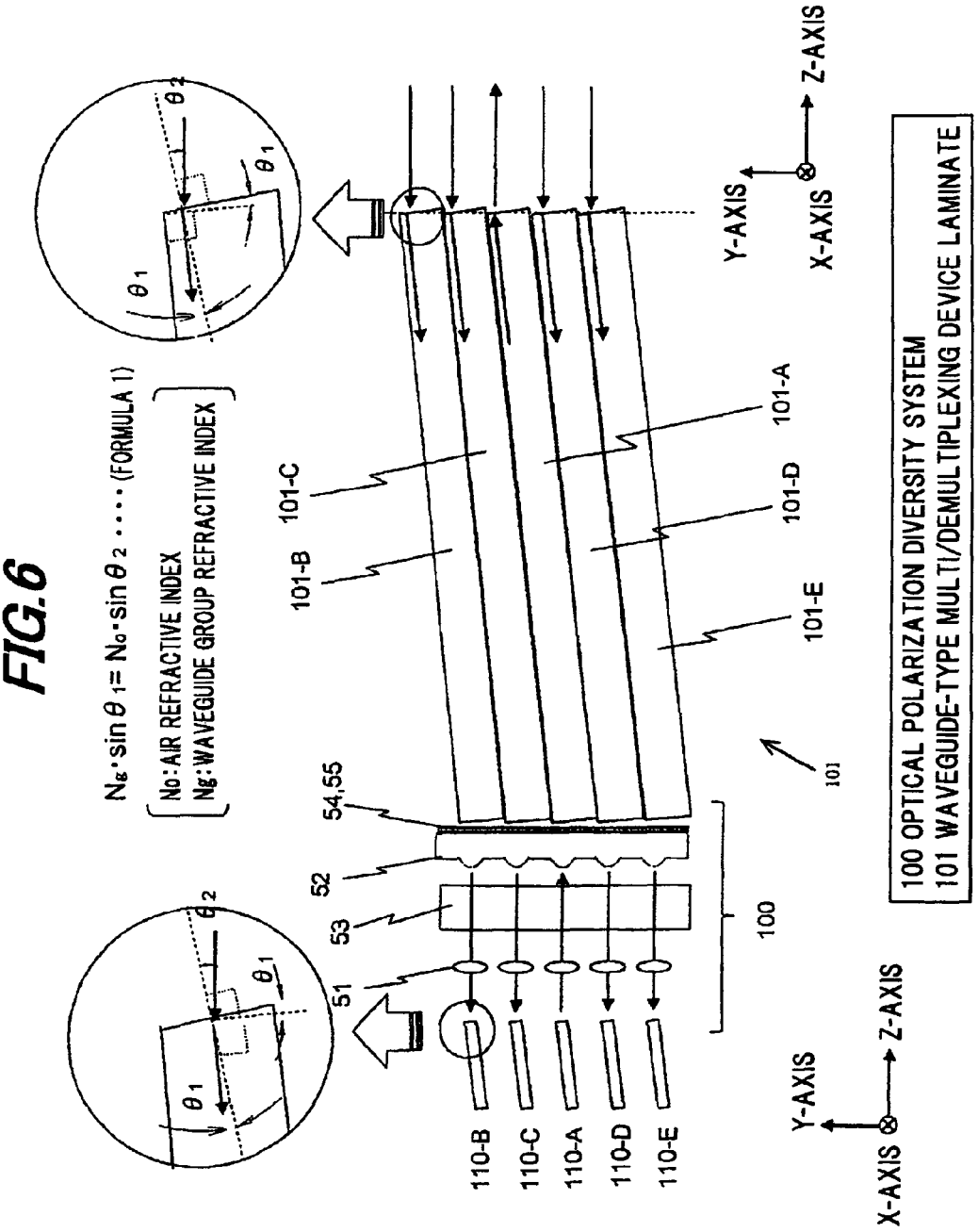

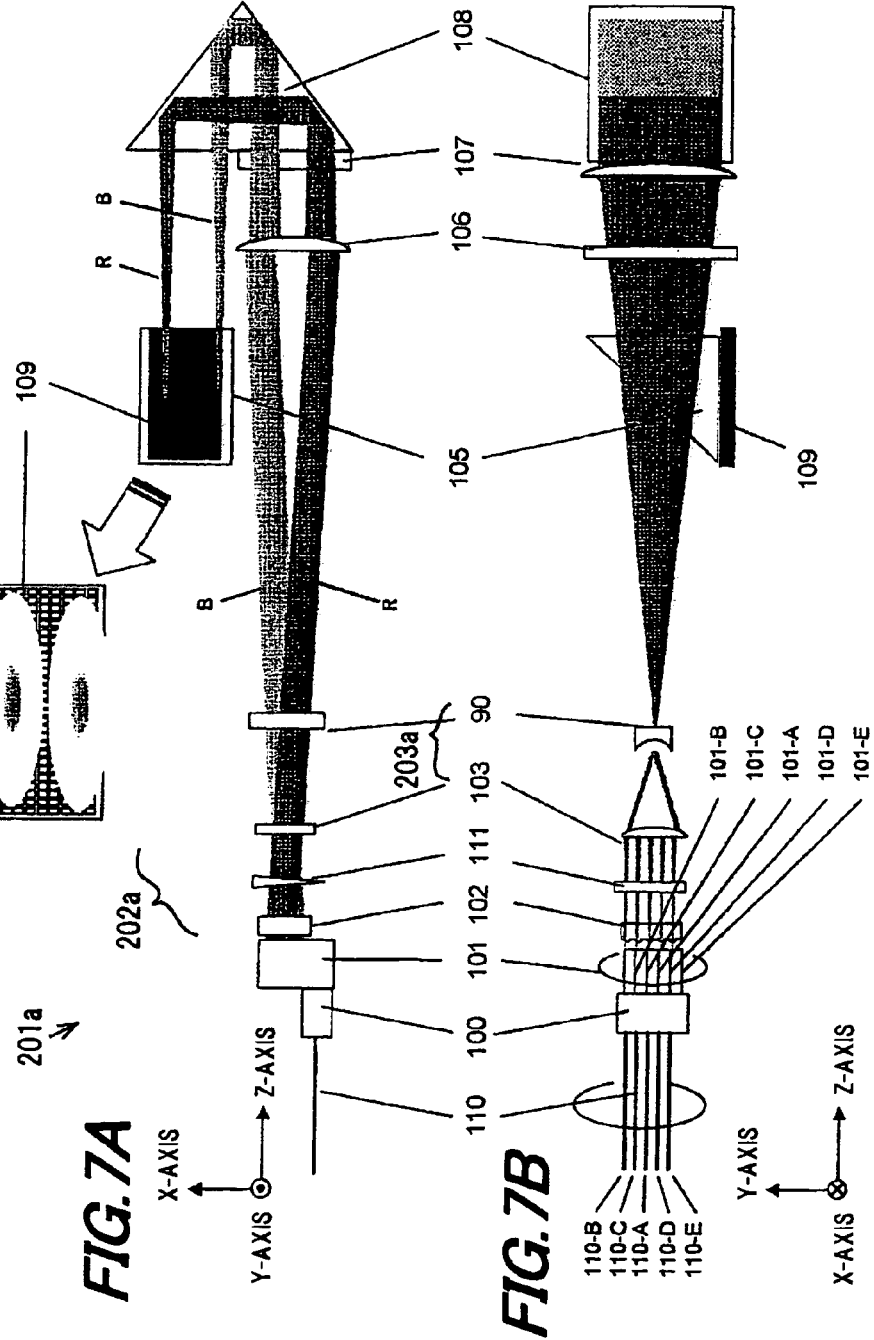

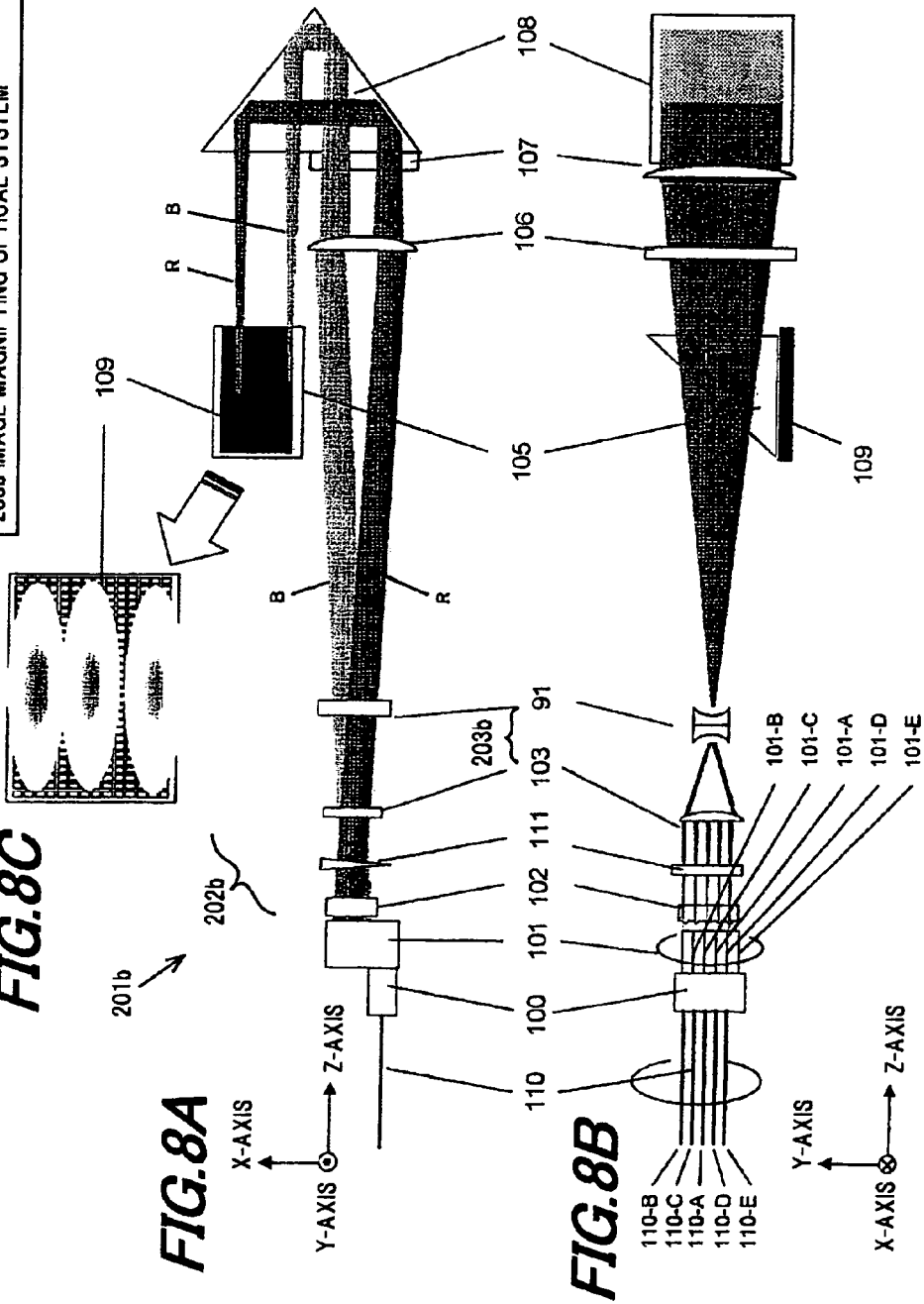

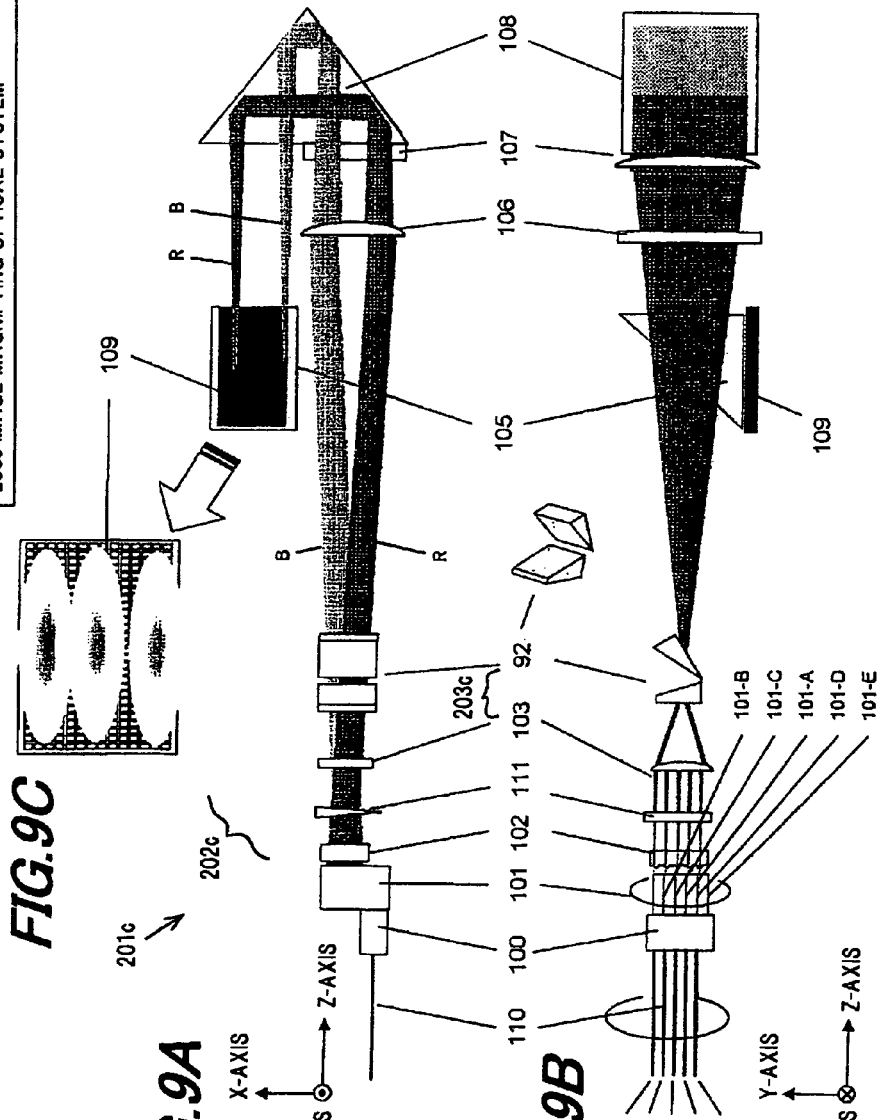

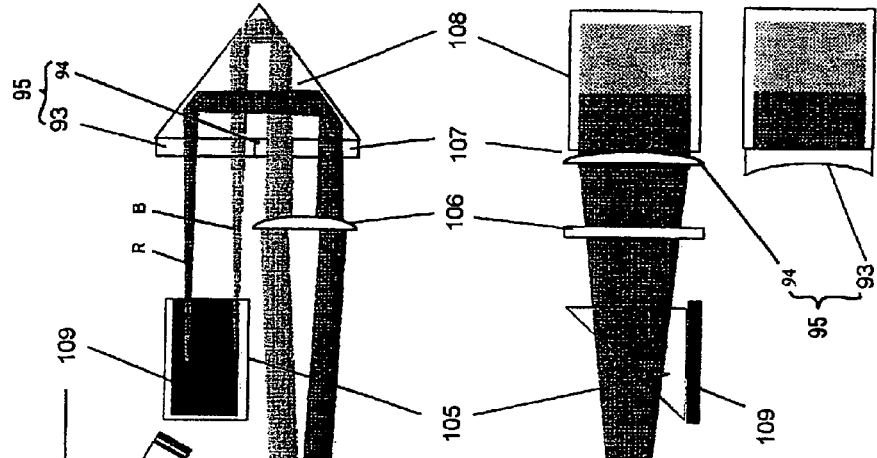
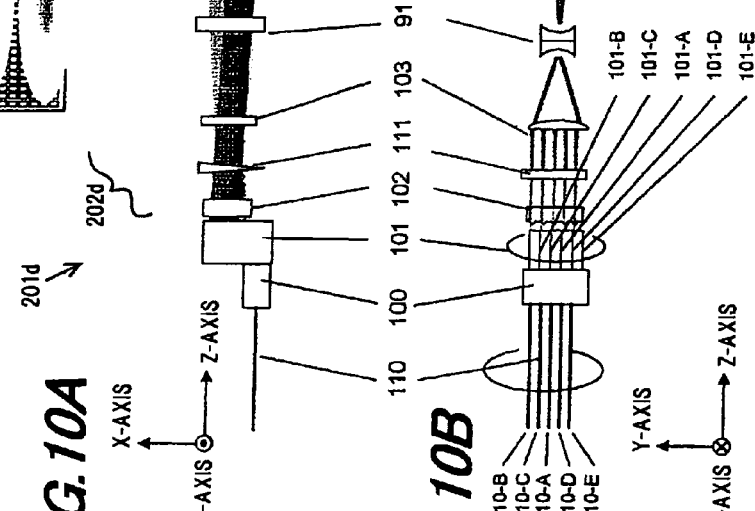

LIGHT IN THIS REGION BEING REFLECTED TOWARD MONITORING WAVEGUIDE 2

2 MONITORING DEMULTIPLEX WAVEGUIDE
5 LIGHT-RECEIVING DEVICE ARRAY
96 WAVEGUIDE-TYPE MULTI/DEMULTIPLEXING DEVICE LAMINATE
101 WAVEGUIDE-TYPE MULTI/DEMULTIPLEXING DEVICE LAMINATE
109 OPTICAL PHASE-MODULATING CELL

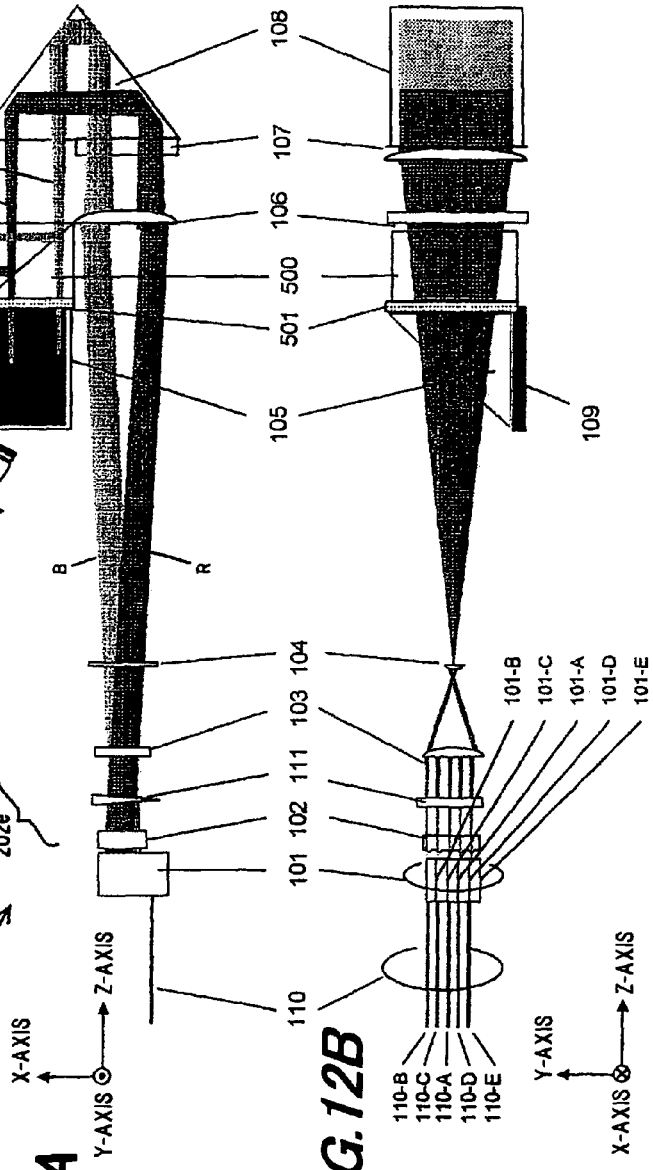
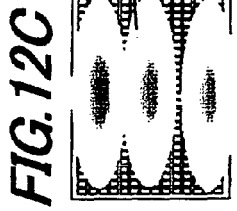
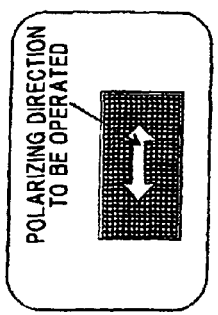
FIG.12A
FIG.12B
FIG.12C
FIG.12D
| 101 | WAVEGUIDE-TYPE MULTI/DEMULTIPLEXING DEVICE LAMINATE |
| --- | --- |
| 109, 109e | OPTICAL PHASE-MODULATING CELL |
| 202e | LENS SYSTEM |
| 500 | POLARIZED BEAM SPLITTER |
| 501 | HALF-WAVELENGTH PLATE |

OPTICAL WAVEGUIDE-TYPE WAVELENGTH DOMAIN SWITCH

The present application is based on Japanese patent application No. 2008-239650 filed on Sep. 18, 2008, the entire contents of which are incorporated herein by reference.

BACKGROUND OF THE INVENTION

1. Field of the Invention

The present invention relates to an optical waveguide-type wavelength domain switch, which obviates shortcomings of conventional wavelength domain optical switches and waveguide-type wavelength selection switches.

2. Description of the Related Art

FIG. 14 shows a conventional wavelength domain optical switch 600. This wavelength domain optical switch 600 is composed of input/output optical fibers 601 to 606, a collimating lens array 610, a Wollaston prism 615 (composed of two triangular prisms 616, 617) for allowing independence of characteristics between horizontal polarization (y-polarization) and vertical polarization (x-polarization), a birefringent plate 620 for zeroing a phase difference between the horizontal polarization and the vertical polarization, a half-wave plate 625 (where only 626 is a half-wave plate and 627 has no effect on polarization), a concave mirror 630, a cylindrical lens 635, a grating 642 with a wedged prism 641, a prism 646 for bending light in a perpendicular direction, and an optical phase-modulating cell 645 called LCOS SLM (liquid crystal on silicon spatial light modulator).

FIG. 15 shows a conventional waveguide-type wavelength-selecting optical switch using an MEMS (micro electro mechanical system) micro mirror. Herein, its structure is such that five substrates with five waveguide-type multi/demultiplexing devices disposed on each substrate are stacked on top of each other. Use of the MEMS micro mirror allows a large reflection angle and therefore this structure, but applying this to a wavelength domain optical switch causes significant performance deterioration.

Refer to US patent publication No. 2006/67611 and U.S. Pat. No. 7,088,882, for example.

The wavelength domain optical switch in FIG. 14 has the following problems.

(1) Because of using the bulk grating, the dimensions of the bulk grating are large and difficult to reduce, though demultiplexing light by one grating is advantageous.

(2) Because of the complex optical system, each optical component and assembling are costly and difficult to reduce cost.

(3) The optical phase-modulating cell operates only for one polarization. For this, the prior art uses polarization diversity using Wollaston prism 615, birefringent plate 620 and half-wave plate 625 to thereby overcome polarization dependency. In this case, to equalize the optical length difference between 2 polarized waves, the birefringent plate 620 is used. However, the birefringent plate 620 has large dimensions, and therefore tends to be affected by refractive index variation with temperature and thermal expansion variation, leading to significant performance deterioration at 0° C.-65° C. environment temperatures in general optical communication device. Controlling the temperature of the entire optical system can reduce performance deterioration, but requires temperature-stabilizing apparatus, increasing dimensions and power consumption, and worsening practicality.

(4) In view of size of the collimating lens array, etc., because of a small reflection angle of the optical phase-modulating cell, the achievable number of input/output ports is limited, and difficult to increase.

The waveguide-type wavelength-selecting optical switch using the MEMS micro mirror in FIG. 15 has the following problems.

(1) Basically, plural waveguide-type multi/demultiplexing devices are disposed on one substrate. Use of the MEMS micro mirror allows a large reflection angle and therefore this structure, but applying this to a wavelength domain optical switch causes significant performance deterioration because of a small reflection angle of the optical phase-modulating cell.

(2) Because the waveguide-type multi/demultiplexing devices are disposed not obliquely but horizontally, reflection is caused at each optical component end face, causing property deterioration.

(3) Although stacking vertically for increasing the number of output ports, size is limited due to micro lens and waveguide-type multi/demultiplexing device substrate thickness, and high-density stacking is impossible. For this, an attempt to achieve multiple ports required in optical communications has difficulty reducing size, and enhancing performance.

(4) Because of demultiplexed wavelength variation due to temperature variation, the waveguide-type multi/demultiplexing devices cannot be used in optical communications, which is a fatal disadvantage.

SUMMARY OF THE INVENTION

Accordingly, it is an object of the present invention to provide an optical waveguide-type wavelength domain switch, which obviates the above shortcomings of conventional wavelength domain optical switches and waveguide-type wavelength selection switches.

(1) According to one embodiment of the invention, an optical waveguide-type wavelength domain switch comprises:

a waveguide-type multi/demultiplexing device laminate comprising three or more laminated waveguide-type multi/demultiplexing devices;

a lens system positioned on a demultiplex side of the waveguide-type multi/demultiplexing device laminate; and a reflective optical phase-modulating cell positioned on an opposite side of the waveguide-type multi/demultiplexing device laminate to the lens system, wherein the lens system comprises a lens alignment comprising plural lenses in one-to-one correspondence with the waveguide-type multi/demultiplexing devices and having a light-collecting or collimating function in the lens-aligning direction, an image-magnifying optical system having an N:1 (N>1) image-magnifying function arranged on the optical phase-modulating cell side of the lens alignment, an f-f lens (Y) arranged on the optical phase-modulating cell side of the image-magnifying optical system, and having a light-collecting or collimating function in the same direction as the lens-aligning direction of the lens alignment, and an f-f lens (X) having a light-collecting or collimating function in a perpendicular direction to the lens-aligning direction of the lens alignment.

In the above embodiment (1), the following modifications and changes can be made.

(i) The optical waveguide-type wavelength domain switch further comprises an optical polarization diversity system positioned on the multiplex side of the waveguide-type multi/demultiplexing device laminate, the optical polarization diversity system comprising a lens pair comprising two lenses arranged in its optical axis and having an image-magnifying function, a polarization-splitting device arranged between the two lenses constituting the lens pair for splitting two polarized beams in mutually orthogonal polarization directions, and a half-wavelength plate arranged at a position through which one of the split polarized beams is passed on the waveguide-type multi/demultiplexing device laminate side relative to the lens pair and for rotating the polarization direction of the one polarized beam through 90°, and the waveguide-type multi/demultiplexing devices comprising two or more multiplexing waveguides, one of which is longer or shorter than the other, to equalize the respective optical path lengths of the two polarized beams in the same polarization direction from the optical polarization diversity system to a slab waveguide in the waveguide-type multi/demultiplexing devices.

(ii) The optical polarization diversity system further comprises a quartz glass substrate with substantially the same thickness as the thickness of the half-wavelength plate and arranged at a position through which the other of the split polarized beams is passed on the waveguide-type multi/demultiplexing device laminate side relative to the lens pair.

(iii) The waveguide-type multi/demultiplexing devices further comprise a specified width slit formed at an intermediate location of the longer multiplexing waveguide than the other of the two or more multiplexing waveguides, and a resin inserted in the slit for compensating for the optical path length difference between the multiplexing waveguides due to temperature variation caused by the resin having a refractive index temperature coefficient with an opposite sign to that of a refractive index temperature coefficient of material constituting the multiplexing waveguides.

(iv) The image-magnifying optical system of the lens system comprises one or more convex lenses and one or more concave lenses, or two or more convex lenses with mutually different focal distances, or one or more convex lenses and two or more prisms arranged at different arrangement angles.

(v) The optical waveguide-type wavelength domain switch further comprises:

a second optical phase-modulating cell arranged orthogonal to the optical phase-modulating cell;

a polarization-splitting device arranged between these optical phase-modulating cells and the lens system;

a half-wavelength plate for the polarization-splitting device arranged at one light output side of the polarization-splitting device and for rotating its polarization direction through 90°; and a driving source for driving the optical phase-modulating cell and the second optical phase-modulating cell with the same control signal.

(vi) The optical waveguide-type wavelength domain switch further comprises a triangular corner cube between the f-f lens (Y) of the lens system and the optical phase-modulating cell, for making incident and reflected light beams parallel to each other.

(vii) The f-f lens (Y) is stuck to the corner cube.

(viii) The f-f lens (Y) comprises a composite lens comprising one convex lens and one concave lens.

(ix) One of the one convex lens and the one concave lens constituting the composite lens is stuck to one-side reflective surface of the corner cube, while the other is stuck to the opposite-side reflective surface of the corner cube.

(x) The optical waveguide-type wavelength domain switch further comprises a triangular mirror between the corner cube and the optical phase-modulating cell, for bending an optical axis through 90°.

(xi) The end face of the waveguide-type multi/demultiplexing devices is formed with non-reflective coating, or ground obliquely at an angle of 6 degrees or more to a virtual plane perpendicular to the surface of the waveguide-type multi/demultiplexing devices, the waveguide-type multi/demultiplexing devices are disposed obliquely at a predetermined angle to an incidence/emission optical axis, and the corner cube and the optical phase-modulating cell are formed with non-reflective coating, or disposed obliquely at a constant angle or more to the surface of the waveguide-type multi/demultiplexing devices.

(xii) The optical waveguide-type wavelength domain switch further comprises a wedge-like demultiplexed wavelength temperature dependency-compensating cell between the waveguide-type multi/demultiplexing devices and the optical phase-modulating cell, which comprises a resin having a refractive index temperature coefficient with an opposite sign to that of a refractive index temperature coefficient of a material forming the waveguide-type multi/demultiplexing devices, and which compensates for demultiplexed wavelength temperature dependency of the waveguide-type multi/demultiplexing devices.

(xiii) The optical waveguide-type wavelength domain switch further comprises on a top layer of the waveguide-type multi/demultiplexing device laminate an optical circuit device formed with an optical coupler comprising a slab waveguide and a monitoring demultiplex waveguide comprising multiple waveguides connected to the slab waveguide.

(xiv) The optical waveguide-type wavelength domain switch further comprises a light-receiving device connected to the monitoring demultiplex waveguide.

(xv) The optical waveguide-type wavelength domain switch further comprises a temperature sensor;

a memory in which demultiplex property data of the waveguide-type multi/demultiplexing devices is written beforehand that varies with temperature measured using the temperature sensor; and correcting means for, based on the data, providing the optical phase-modulating cell with additional phase distribution and thereby correcting a demultiplexed wavelength deviation of the waveguide-type multi/demultiplexing devices due to temperature variation.

POINTS OF THE INVENTION

According to one embodiment of the invention, an image-magnifying optical system is used to demagnify approximately 0.5 mm beam spacing to 1/N (e.g., ⅕, approximately 0.1 mm). This allows an optical distribution of 5 µm-size spots spaced approximately 0.5 mm apart immediately after being emitted from waveguide-type multi/demultiplexing devices of a waveguide-type multi/demultiplexing device laminate to be converted into an optical distribution of approximately 10 µm-size spots spaced approximately 0.1 mm apart, thereby allowing sufficient switching even by an optical phase-modulating cell with a small polarizing angle.

BRIEF DESCRIPTION OF THE DRAWINGS

The preferred embodiments according to the invention will be explained below referring to the drawings, wherein:

FIGS. 1A and 1B are a top view and side view, respectively, showing an optical waveguide-type wavelength domain switch in one embodiment according to the invention, and FIG. 1C is a plan view showing a beam-applied surface;

FIG. 2 is a 3-dimensional diagram showing lens system structure used in the invention and magnifying/demagnifying beam images;

FIG. 3A is a cross-sectional view showing a laminated structure of an optical phase-modulating cell used in the invention, FIG. 3B is a front view showing a pixel plane (XZ-plane) of the optical phase-modulating cell, and FIG. 3C is a diagram showing a refractive index distribution in the XZ-plane;

FIG. 5 is a top view showing an optical polarization diversity system used in the invention;

FIG. 6 is a side view showing the waveguide-type multi/demultiplexing device laminate and optical polarization diversity system used in the invention;

FIGS. 7A and 7B are a top view and side view, respectively, showing an optical waveguide-type wavelength domain switch in another embodiment according to the invention, and FIG. 7C is a plan view showing a beam-applied surface;

FIGS. 8A and 8B are a top view and side view, respectively, showing an optical waveguide-type wavelength domain switch in another embodiment according to the invention, and FIG. 8C is a plan view showing a beam-applied surface;

FIGS. 9A and 9B are a top view and side view, respectively, showing an optical waveguide-type wavelength domain switch in another embodiment according to the invention, and FIG. 9C is a plan view showing a beam-applied surface;

FIGS. 10A and 10B are a top view and side view, respectively, showing an optical waveguide-type wavelength domain switch in another embodiment according to the invention, and FIG. 10C is a plan view showing a beam-applied surface;

FIGS. 12A and 12B are a top view and side view, respectively, showing an optical waveguide-type wavelength domain switch in another embodiment according to the invention, FIG. 12C is a plan view showing a beam-applied surface, and FIG. 12D is a plan view showing polarizing directions;

DETAILED DESCRIPTION OF THE PREFERRED EMBODIMENTS

Embodiment

Figure 4:
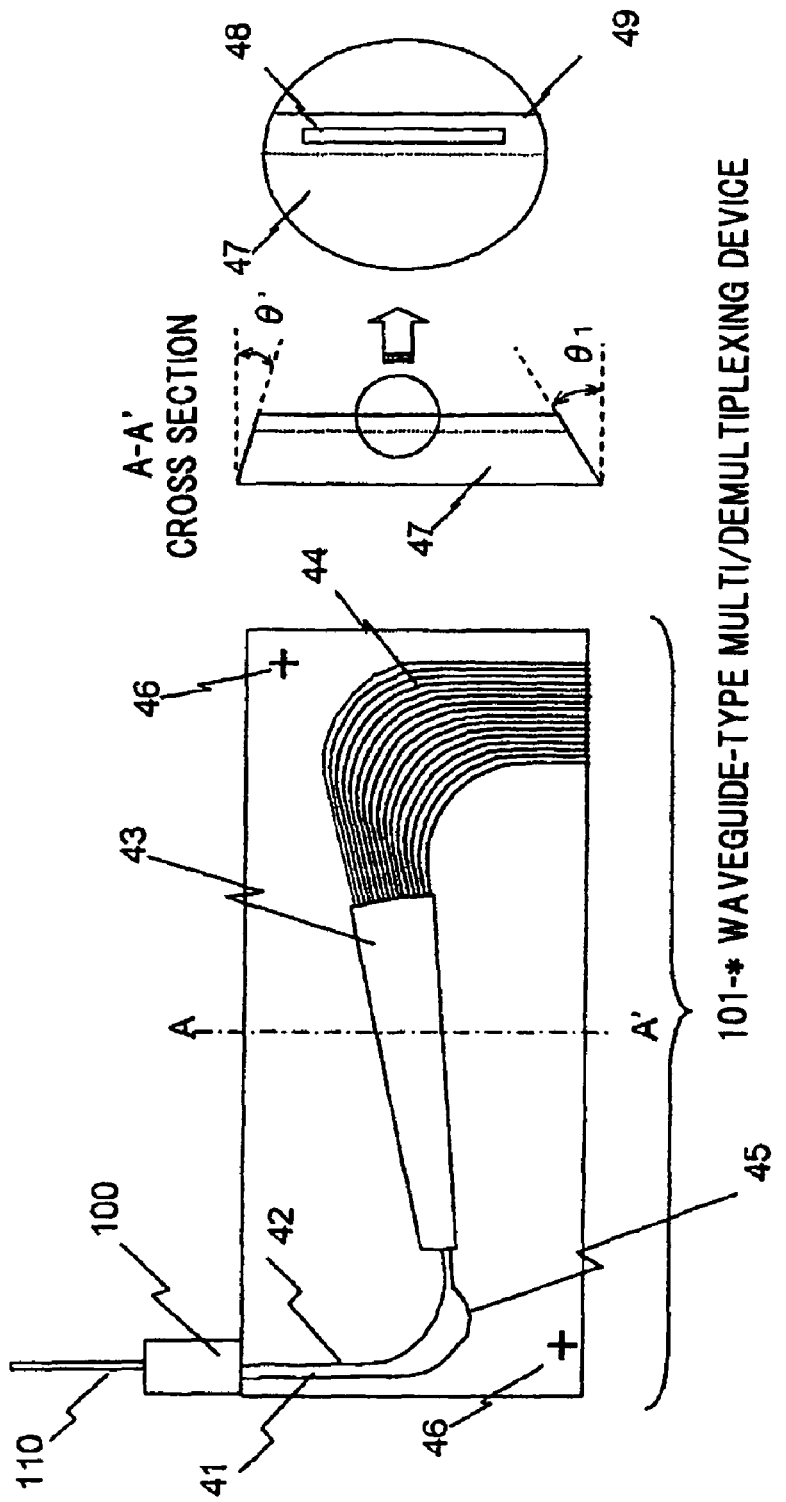
FIG. 4 is a plan view showing a waveguide-type multi/demultiplexing device used in the invention, including an A-A' cross-sectional view and partially enlarged view thereof.

Below is described one embodiment according to the invention, referring to the drawings.

FIGS. 1A and 1B show an optical waveguide-type wavelength domain switch 201 in one embodiment according to the invention. FIG. 1A is a top view in the XZ-plane in the Y-axis direction, and FIG. 1B is a side view in the YZ-plane in the X-axis direction.

As shown in FIGS. 1A and 1B, in the optical waveguide-type wavelength domain switch 201, an optical polarization diversity system 100 is connected to an optical fiber group 110 comprising plural optical fibers, and a waveguide-type multi/demultiplexing device laminate 101 is connected to the optical polarization diversity system 100. The detailed structure of the optical polarization diversity system 100 will be explained later with FIG. 5. The waveguide-type multi/demultiplexing device laminate 101 comprises waveguide-type multi/demultiplexing devices 101-* (* denotes A, B, ... ) of FIG. 4 laminated in the order of waveguide-type multi/demultiplexing device 101-E, 101-D, 101-A, 101-C, and 101-B, as shown in FIG. 2.

The optical fiber group 110 is composed of an input optical fiber 110-A, output optical fibers 110-B, 110-C, 110-D, and 110-E. In this manner, the optical waveguide-type wavelength domain switch 201 in this embodiment has one input and four outputs. In the invention, the optical input and outputs are compatible, and therefore input and output members, such as the input and output optical fibers, multiplexing and demultiplexing waveguides, etc. are functionally interchangeable.

The optical waveguide-type wavelength domain switch 201 includes the waveguide-type multi/demultiplexing device laminate 101 comprising 3 or more laminated waveguide-type multi/demultiplexing devices 101-*, a lens system 202 positioned on the demultiplex side of the waveguide-type multi/demultiplexing device laminate 101, and a reflective optical phase-modulating cell 109 positioned on the opposite side of the waveguide-type multi/demultiplexing device laminate 101 to the lens system 202. The detailed structure of the optical phase-modulating cell 109 will be explained later with FIGS. 3A-3C.

The lens system 202 includes a lens alignment 102 comprising plural lenses in one-to-one correspondence with the waveguide-type multi/demultiplexing devices 101-* of the waveguide-type multi/demultiplexing device laminate 101, and having a light-collecting or collimating function in the lens-aligning direction, an image-magnifying optical system 203 having an N:1 (N>1) image-magnifying function arranged on the optical phase-modulating cell 109 side of the lens alignment 102, an f-f lens (Y) 107 arranged on the optical phase-modulating cell 109 side of the image-magnifying optical system 203, and having a light-collecting or collimating function in the same direction as the lens-aligning direction of the lens alignment 102, and an f-f lens (X) 106 having a light-collecting or collimating function in the perpendicular direction to the lens-aligning direction of the lens alignment 102.

The lens alignment 102, image-magnifying optical system 203, f-f lens (X) 106, and f-f lens (Y) 107 are arranged substantially linearly in the Z-axis.

The lens system 202 in this embodiment is provided with a triangular corner cube 108 between the f-f lens (X) 106 of the lens system 202 and the optical phase-modulating cell 109, for making incident and reflected light beams parallel to each other. The corner cube 108 allows incident light beams from the lens system 202 to be reflected parallel to the incident direction without aberration, and injected into the optical phase-modulating cell 109.

The corner cube 108 causes incident light beams parallel to the Z-axis to be first reflected in the X-axis direction, and then reflected parallel to the Z-axis. The f-f lens (Y) 107 faces the lower half in the X-axis direction of the corner cube 108, and the upper half in the X-axis direction of the corner cube 108 forms an optical path for the reflected light beams.

The lens system 202 in this embodiment is provided with a triangular mirror 105 for causing the light beams reflected at the corner cube 108 to be bent at 90 degrees and injected into the optical phase-modulating cell 109. The triangular mirror 105 is provided in an upper portion in the X-axis direction of the space extending from the lens alignment 102 to the f-f lens (Y) 107 of the lens system 202. The triangular mirror 105 is provided so that its reflecting surface is tilted relative to the Y-axis, to cause the light beams to be injected into the optical phase-modulating cell 109 placed in the XZ-plane.

The lens system 202 in this embodiment is provided with a wedge-like demultiplexed wavelength temperature dependency-compensating cell 111 between each waveguide-type multi/demultiplexing device of the waveguide-type multi/demultiplexing device laminate 101 and the optical phase-modulating cell 109, which comprises a resin having a refractive index temperature coefficient with an opposite sign to that of a refractive index temperature coefficient of a material forming the waveguide-type multi/demultiplexing devices, and which compensates for demultiplexed wavelength temperature dependency of the waveguide-type multi/demultiplexing devices.

As shown in FIG. 2, the lens system 202 comprises the lens alignment 102, image-magnifying optical system 203, f-f lens (X) 106, and f-f lens (Y) 107 arranged in this order shown, between the waveguide-type multi/demultiplexing device laminate 101 and the optical phase-modulating cell 109. The corner cube 108 and the triangular mirror 105 are omitted for simplification. The image-magnifying optical system 203 is constructed by a pre-lens 103 and a post-lens 104.

The lens alignment 102 is formed of plural convex cylindrical lenses aligned on one side of a transparent sheet at a specified pitch. The cylindrical lenses face the demultiplex-side end faces of the waveguide-type multi/demultiplexing devices 101-E, 101-D, 101-A, 101-C, and 101-B, respectively (i.e., in the FIG. 1A-1C embodiment, the output end for waveguide-type multi/demultiplexing device 101-A, and the input ends for waveguide-type multi/demultiplexing devices 101-E, 101-D, 101-C, and 101-B). The pre-lens 103 and the post-lens 104 each are constructed by a cylindrical lens having a light-collecting or collimating function in the Y-axis direction, i.e., in the lens-aligning direction of the lens alignment 102. The f-f lens (X) 106 is constructed by a cylindrical lens having a light-collecting or collimating function in the X-axis direction. The f-f lens (Y) 107 is constructed by a cylindrical lens having a light-collecting or collimating function in the Y-axis direction.

Light emitted from each waveguide-type multi/demultiplexing device 101-* has as small a spot size as 5 μm in optical distribution in the Y-axis direction, and is therefore propagated in a manner that magnifies its spot size rapidly. To this end, each spot size is magnified approximately tenfold to 50 μm by the lens alignment 102 having a light-collecting or collimating function in the Y-axis direction.

The waveguide-type multi/demultiplexing device laminate 101 is constructed by stacking the waveguide-type multi/demultiplexing devices 101-* at a slight tilt angle to the Y-axis. When each waveguide-type multi/demultiplexing device 101-* substrate is 0.5 mm thick, the total thickness is 2.5 mm. Light emitted from each waveguide-type multi/demultiplexing device 101-E, 101-D, 101-A, 101-C, and 101-B (in the FIG. 1A-1C embodiment, incident light for waveguide-type multi/demultiplexing devices 101-E, 101-D, 101-C, and 101-B) forms 5 beams distributed to be spaced approximately 0.5 mm apart in the Y-axis direction. The 5 beams are distributed in the Y-axis direction in the range of approximately 2.5 mm in total.

In contrast, the polarizing angle of the optical phase-modulating cell 109 cannot be very large. Accordingly, the invention uses the image-magnifying optical system 203, to demagnify the above-mentioned approximately 0.5 mm beam spacing to ⅕, approximately 0.1 mm.

This allows the optical distribution of 5 μm-size spots spaced approximately 0.5 mm apart immediately after being emitted from the waveguide-type multi/demultiplexing devices of the waveguide-type multi/demultiplexing device laminate 101 to be converted into the optical distribution of approximately 10 μm-size spots spaced approximately 0.1 mm apart, thereby allowing sufficient switching even by the optical phase-modulating cell 109 with a small polarizing angle.

As shown in FIG. 3B, the optical phase-modulating cell 109 has multiple pixels as small as on the order of 5-10 μm. Each pixel has a refractive index substantially varied by liquid crystal orientation varied according to voltage applied.

As shown in FIG. 3A, the optical phase-modulating cell 109 comprises a thin glass substrate 31, common electrode 32, $SiO_2$ film 33, liquid crystal 34, oriented film 35, reflective multilayer film 36, pixel electrode (not shown), $SiO_2$ film 33, common electrode 32, ground electrode 38, and Si substrate 37 formed with an electronic circuit.

When voltage with sawtooth distribution along the Z-axis is applied to each pixel, the refractive index distribution has the shape based on the voltage, as shown in FIG. 3C. This allows the optical phase-modulating cell 109 to control the incident light wavefront, and polarize the reflected light.

In the optical waveguide-type wavelength domain switch 201 of FIGS. 1A and 1B, light emitted from the waveguide-type multi/demultiplexing device laminate 101 and passed through the lens system 202 is injected into the optical phase-modulating cell 109, and reflected thereat, through the lens system 202, into the waveguide-type multi/demultiplexing devices 101-E, 101-D, 101-C, and 101-B, and multiplexed thereat, and subsequently emitted from output optical fibers 110-B, 110-C, 110-D, and 110-E. In this case, voltage to be applied to the optical phase-modulating cell 109 is controlled variously as shown in FIG. 3C, to thereby control the polarizing angle of the reflected light, to select the output optical fibers 110-B, 110-C, 110-D, and 110-E. The optical phase-modulating cell 109 operates only for one polarization, but does not operate for polarized light oscillating perpendicular thereto. Accordingly, this embodiment uses a novel optical polarization diversity system, as explained below.

Referring to FIG. 5, an optical polarization diversity system 100 comprises a collimating lens 51 facing output of input optical fiber 110-A, a polarization-splitting device 53 comprising a Wollaston prism formed of calcites stuck together, a condenser lens array 52, a half-wavelength plate 55 and a quartz glass 54 stuck on one side of the condenser lens array 52. The half-wavelength plate 55 faces a multiplexing waveguide 41 of waveguide-type multi/demultiplexing device 101-*. The quartz glass 54 faces a multiplexing waveguide 42 of waveguide-type multi/demultiplexing device 101-*. The collimating lens 51 and the condenser lens array 52 constitute a lens pair.

The optical polarization diversity system 100 has the input and output ports. Because the input and output ports operate in the same manner except that propagating directions therein are opposite, the input port operation is explained herein. The input port is connected to the input optical fiber 110-A. Light injected into the input optical fiber 110-A is collimated by the collimating lens 51, and thereafter injected into the polarization-splitting device 53. The light through the polarization-splitting device 53 is split into a Y-polarized wave oscillating perpendicular to the page (i.e., in the Y-axis) and an X-polarized wave oscillating parallel to the page (i.e., in the X-axis). The Y- and X-polarized waves are propagated in different directions in the XZ plane at an angle of 20°, and injected into the condenser lens array 52.

Half-wavelength plate 55 and quartz glass 54 are stuck on one side of the condenser lens array 52. This causes the X-polarized wave through the half-wavelength plate 55 to spatially change its oscillating direction through 90° into a Y-polarized wave. On the other hand, the Y-polarized wave through the quartz glass 54 is passed therethrough to preserve its polarized direction. In this manner, the Y-polarized waves in the same direction each are collected and propagated parallel in the Z-axis direction, and injected into the two multiplexing waveguides 41 and 42 respectively of the waveguide-type spectrometer 101.

In this case, focal distance f1 of the collimating lens 51 and focal distance f1 of the condenser lens array 52 are designed based on Formula (2), thereby allowing equal spot size of the two multiplexing waveguides 41 and 42 of the waveguide-type spectrometer 101, and the input optical fiber 110-A, and therefore low-loss connection.

$$M = f2/f1 \quad (2)$$

where the value of M is obtained from $M=\omega 1/\omega 2$ ($\omega 1$: the spot diameter of multiplexing waveguides 41 and 42 of waveguide-type multi/demultiplexing device 101-*, $\omega 2$: the spot diameter of input optical fiber 110-*).

Referring to FIG. 4, any waveguide-type multi/demultiplexing device 101-* has a waveguide constructed by embedding a high refractive index core 48 in cladding 49 with a lower refractive index than that of the core 48. In this embodiment, the core 48 and cladding 49 material use quartz glass.

The waveguide-type multi/demultiplexing device 101-* comprises two or more multiplexing waveguides 41, 42, a slab waveguide 43 connected to the multiplexing waveguides 41, 42 and having a confining structure only in the thickness direction of the core 48, and a demultiplexing waveguide 44 connected to the slab waveguide 43 and comprising multiple aligned waveguides whose lengths are varied sequentially by constant length. The waveguide-type multi/demultiplexing device 101-* is provided with a flat plate substrate 47 on which are arranged one multiplexing waveguide 41, one multiplexing waveguide 42, one slab waveguide 43 and one demultiplexing waveguide 44.

The substrate 47 is a quartz or silicon substrate. In general, quartz glass has a refractive index small compared with other materials, and which is varied with temperature. For this reason, the demultiplexed wavelength of waveguide-type multi/demultiplexing device 101-* is varied with temperature. In this invention, as will be explained later, a resin having a refractive index temperature coefficient with an opposite sign to that of a refractive index temperature coefficient of quartz glass is inserted in a wedge-like cell, and this is disposed in the lens system, thereby ensuring temperature independence.

The multiplexing waveguides 41, 42 are connected with the above-mentioned optical polarization diversity system 100. The 2 polarized beams through the optical polarization diversity system 100 have been passed by polarization through the different mediums of polarization-splitting device 53, half-wavelength plate 55 and quartz glass 54, and therefore have mutually different optical path lengths. To equalize this, in this invention, one of multiplexing waveguides 41 and 42 of waveguide-type multi/demultiplexing device 101-* is provided with an optical path length-correcting portion 45, thereby strictly matching the optical path lengths of the 2 polarized waves.

The light oscillating in the Y-axis direction injected into multiplexing waveguides 41 and 42 is injected via the above-mentioned optical path length-correcting portion 45 into the slab waveguide 43, diffracted, expanded in the X-axis direction, injected into the demultiplexing waveguide 44, via the above-mentioned various optical systems, and applied to the optical phase-modulating cell 109.

The waveguide-type multi/demultiplexing device laminate 101 used in this invention is constructed by stacking 5 waveguide-type multi/demultiplexing devices 101-* in the Y-axis direction. Accordingly, they are provided with aligning marks 46 for precise alignment.

As shown in the A-A' cross-section of FIG. 4, both end faces of waveguide-type multi/demultiplexing device 101-* are ground obliquely so as not to directly return the light reflected at the boundary. The grinding angle $\theta'$ at one end face and the grinding angle $\theta 1$ at the other end face are determined according to needs, and may be equal or unequal to each other.

The aligning marks 46 are made by patterning with exposure apparatus simultaneously with the waveguides, therefore allowing very high precision to be ensured. Accordingly, superimposing the respective aligning marks 46 of the devices allows enhancement in relative position accuracy of the devices. The quartz glass waveguide devices allow the aligning marks 46 of the devices on the upper and lower sides to be observed by visible light. Also, the Si substrates which transmit near infrared light allow the aligning marks 46 of the devices on the upper and lower sides to be observed by light with a wavelength of 0.8 microns to a few microns.

When observing the aligning marks 46 of each device from a direction perpendicular to the surface of each device 101-*, the aligning marks 46 of each device are deviated subtly, but when superimposing the respective aligning marks 46 of the devices, the aligning marks 46 of each device are not deviated because of observing the aligning marks 46 of each device from the Y-axis direction.

Referring to FIG. 6, in this embodiment, waveguide-type multi/demultiplexing device laminate 101 is constructed by laminating the waveguide-type multi/demultiplexing devices 101-E, 101-D, 101-A, 101-C, and 101-B. The waveguide-type multi/demultiplexing devices 101-* are stacked without gaps, and joined using optical adhesive. The number of waveguide-type multi/demultiplexing devices 101-* may be 3 or more, and be varied according to optical system configuration requirements.

To reduce the return light by Fresnel reflection at the interface, the end faces of waveguide-type multi/demultiplexing device 101-* and the input optical fiber 110-A, output optical fibers 110-B, 110-C, 110-D, and 110-E are ground obliquely at approximately 8°, and disposed to be tilted at an angle based on Formula (1) to propagate light in the X-axis direction.

$$Ng \cdot \sin \theta 1 = No \cdot \sin \theta 2 \quad (1)$$

where Ng is the waveguide group refractive index, and No is the air refractive index. $\theta 1$ and $\theta 2$ are the angles defined in FIG. 6, and $\theta 1$ is the grinding angle shown in FIG. 4. As one example, when $\theta 1$ is 8° the same as the above grinding angle of the optical fibers, $\theta 2$ is 11.6°.

Operation of Optical Waveguide-Type Wavelength Domain Switch

Operation of the optical waveguide-type wavelength domain switch 201 of this invention is explained, based on its construction explained above.

The optical waveguide-type wavelength domain switch 201 of FIGS. 1A and 1B demultiplexes an optical multiplexed-wavelength signal input from input optical fiber 110-A, at waveguide-type multi/demultiplexing device 101-A, into red light ray R and blue light ray B, for example. These light rays are passed via lens system 202 and injected into optical phase-modulating cell 109.

The light emitted from waveguide-type multi/demultiplexing devices 101-A, 101-B, 101-C, 101-D, and 101-E (emitted from waveguide-type multi/demultiplexing device 101-A, injected into waveguide-type multi/demultiplexing devices 101-B, 101-C, 101-D, and 101-E) has substantially oblate distributions with the beam width of 5 μm (Y-axis)×5000 μm (X-axis). In general, small spot-size light expands substantially with propagation due to diffraction. On the other hand, it is known that large spot-size light is unlikely to expand. For this reason, substantially no optical distributions expand in the X-axis direction as shown in FIG. 1A due to diffraction, but the light is propagated as substantially parallel light, injected into f-f lens (X) 106 having a light-collecting function in the X-axis direction, and collected onto optical phase-modulating cell 109. The light wavefront shape is not varied by f-f lens (Y) 107 collecting light in the Y-axis direction, but the light is only passed therethrough.

Here, in this embodiment, corner cube 108 is provided between the f-f lens (Y) 107 and the optical phase-modulating cell 109, to thereby return light. This allows a reduction in the longitudinal dimension of the optical waveguide-type wavelength domain switch 201.

Also, in this embodiment, the light propagating in the Z-axis direction from corner cube 108 is bent through 90° by triangular mirror 105, to be reflected in the Y-axis direction, and thereby injected into optical phase-modulating cell 109 disposed at the bottom (in the XZ-plane).

Also, in this embodiment, the f-f lens (Y) 107 is stuck directly to the corner cube 108. This makes the assembling convenient.

Also, in this embodiment, a wedge-like demultiplexed wavelength temperature dependency-compensating cell 111 is provided after lens alignment 102, in which is inserted a resin having a refractive index temperature coefficient with an opposite sign to that of a refractive index temperature coefficient of quartz glass. This ensures demultiplexed wavelength temperature independence.

The above operation is the same for all light rays (red light ray R and blue light ray B) demultiplexed by the waveguide-type multi/demultiplexing devices. The actual system uses 40 or more different wavelength light rays.

Features and Advantages of Optical Waveguide-Type Wavelength Domain Switch

Next are explained main features and advantages of the optical waveguide-type wavelength domain switch of the invention.

(1) In this invention, there is formed waveguide-type multi/demultiplexing device 101-* with only one optical circuit having a multi/demultiplexing function disposed on the same substrate. Using the 3 or more waveguide-type multi/demultiplexing devices 101-*, waveguide-type multi/demultiplexing device laminate 101 is formed by high-density laminating them in the thickness direction (in the prior art, basically, by lateral integration).

(2) To obviate the shortcoming of small reflection angle of optical phase-modulating cell 109, this invention uses image-magnifying optical system 203 having an N:1 (N>1) image-magnifying function.

This can provide a very small thin optical waveguide-type wavelength domain switch with 10 or more output ports required in optical communications.

(3) This invention is equipped with wedge-like demultiplexed wavelength temperature dependency-compensating cell 111. This can inhibit demultiplexed wavelength variation due to temperature variation that is the problem of prior MEMS-type waveguide-type multi/demultiplexing device, so as not to cause any practical problem at all.

Figure 14:
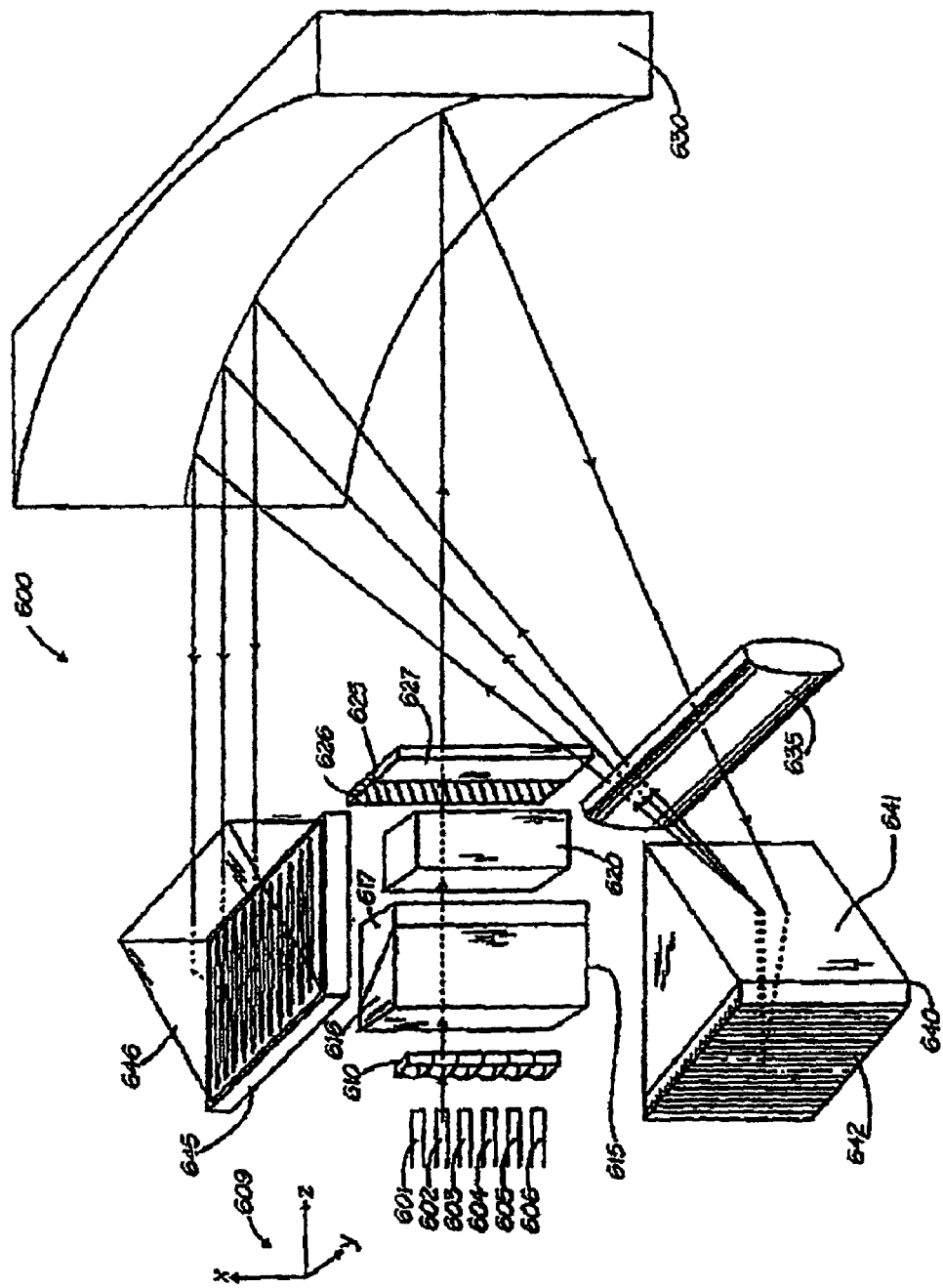
FIG. 14 is a diagram showing a conventional optical wavelength domain switch.

(4) To obviate the problem in the prior art of FIG. 14 using the optical phase-modulating cell, this invention is provided with the following elements.

A lens pair having an image-magnifying function is arranged between optical fiber group 110 and multiplexing waveguides 41, 42 of waveguide-type multi/demultiplexing device 101-*. Use of this lens pair allows the optical distributions of the optical fiber group 110 to coincide with the optical distributions of the multiplexing waveguides 41, 42 of waveguide-type multi/demultiplexing device 101-* and thereby make the loss very small.

A prism (polarization-splitting device 53 comprising a Wollaston prism) having a polarized wave-splitting function is arranged in collimated light ray portion between the lens pair, and half-wavelength plate 55 is arranged between the lens pair and the multiplexing waveguides of the waveguide-type multi/demultiplexing device.

To equalize the optical path length difference between 2 split polarized waves, one of the multiplexing waveguides of the waveguide-type multi/demultiplexing device is configured to be longer or shorter than the other.

When one of the multiplexing waveguides of the waveguide-type multi/demultiplexing device is configured to be longer or shorter than the other, to compensate for the optical path length difference between the 2 waveguides caused by temperature variation, a specified width slit is provided at an intermediate location of the longer waveguide, and in that slit is inserted a resin having a refractive index temperature coefficient with an opposite sign to that of a refractive index temperature coefficient of material constituting the waveguide.

This eliminates the need of a temperature controller, thereby allowing miniaturization and low power consumption of the optical waveguide-type wavelength domain switch of the invention.

(5) In the invention, its substantial miniaturization is achieved by corner cube 108 returning light.

(6) In the invention, to inhibit property deterioration due to reflection, the end face of waveguide-type multi/demultiplexing device 101-* is formed with non-reflective coating, or ground obliquely at an angle of 6 degrees or more. To facilitate assembling, laminated waveguide-type multi/demultiplexing devices 101-* are disposed obliquely at a predetermined angle. The corner cube 108 and optical phase-modulating cell 109 are formed with non-reflective coating, or disposed obliquely at a constant angle or more.

In the invention, to inhibit demultiplexed wavelength variation due to temperature variation of waveguide-type multi/demultiplexing device 101-*, wedge-like demultiplexed wavelength temperature dependency-compensating cell 111 is disposed between the waveguide-type multi/demultiplexing device 101-* and the optical phase-modulating cell 109, in which is inserted a resin having a refractive index temperature coefficient with an opposite sign to that of a refractive index temperature coefficient of material constituting the waveguide-type multi/demultiplexing device. This ensures demultiplexed wavelength temperature independence.

The prior art of FIG. 14 uses only one bulk spectrometer, whereas the present invention uses 3 or more waveguide-type multi/demultiplexing devices 101-* with only one optical circuit having a multi/demultiplexing function disposed on one substrate, and image-magnifying optical system 203 having an N:1 (N>1) image-magnifying function.

For high-density laminating in the thickness direction, each waveguide-type multi/demultiplexing device 101-* substrate is approximately not more than 1 mm thick, and has substantially no gap between the substrates, and the substrates are fixed with optical adhesive. In this case, for high precise alignment of each waveguide-type multi/demultiplexing device 101-*, aligning marks 46 are provided thereon. The total thickness of the laminated waveguide-type multi/demultiplexing devices 101-* is at most approximately a few mm (e.g., when each substrate is 0.5 mm thick, the 10 substrates are 5 mm thick), and when using a 10:1 image-magnifying function, is at most approximately a few hundreds of µm (e.g., when each substrate is 0.5 mm thick, the 10 substrates, 5 mm-thick, are demagnified to 500 µm thickness).

Figure 15:
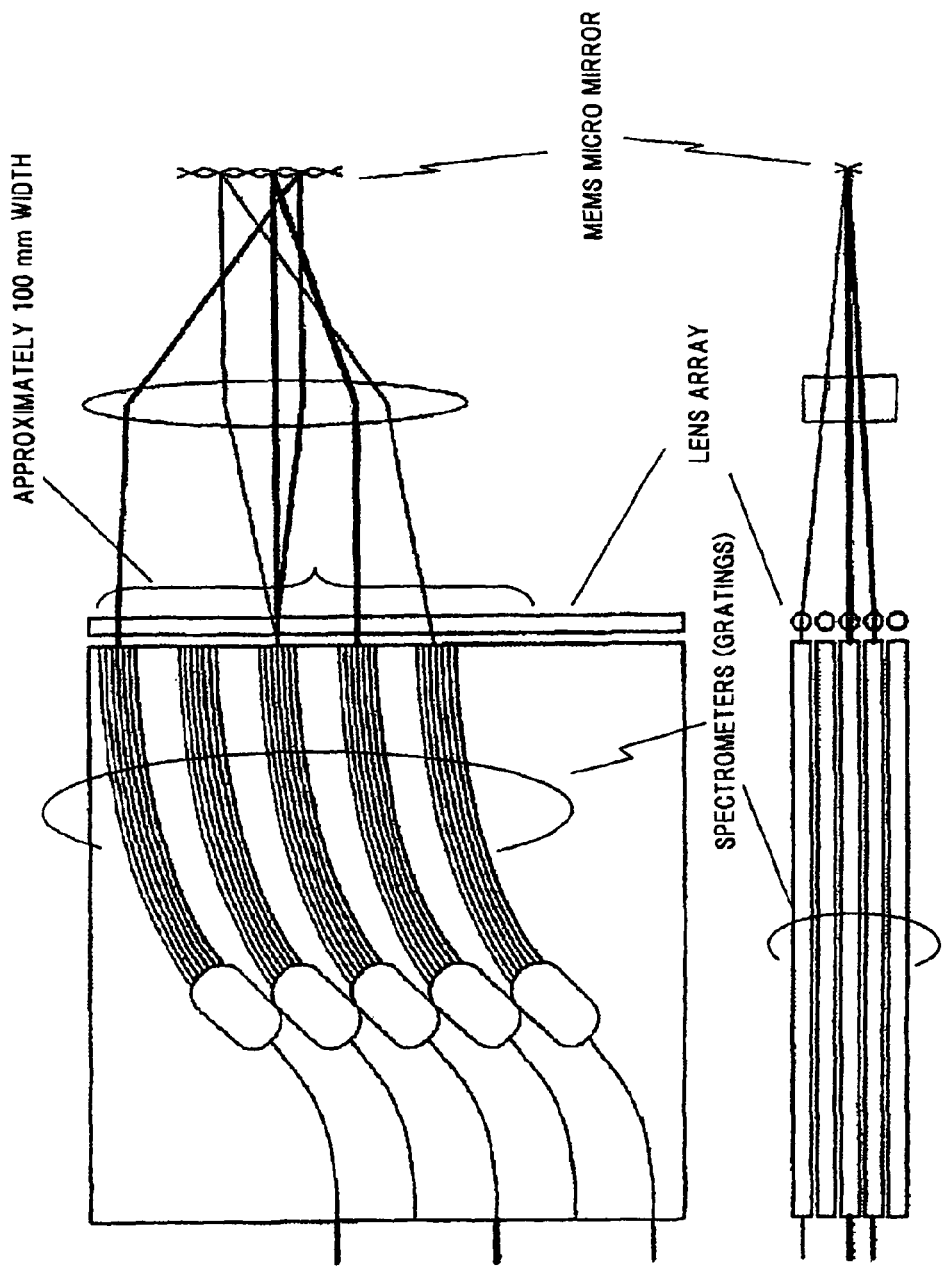
FIG. 15 is a diagram showing a conventional waveguide-type wavelength-selecting switch.

The prior art of FIG. 15 uses a few waveguide-type wavelength spectrometers arranged on one substrate. In this case, the width between the waveguide-type wavelength spectrometers is on the order of 100 mm. The present invention substantially reduces the width to approximately 1/20. This allows sufficient operation even with an optical phase-modulating cell which cannot make the polarizing angle large. This effect makes it possible to achieve a large-scale optical waveguide-type wavelength domain switch with approximately 100 ports, which is difficult in the prior art.

The flexibility of the optical waveguide-type wavelength domain switch is substantially extended by replacing the laminated waveguide-type multi/demultiplexing devices with waveguide substrates having another function. For example, an optical network requires a function of monitoring which wavelength and what degree of power are transmitted at each node. An optical waveguide-type wavelength domain switch capable of monitoring wavelengths and power can be realized by laminating an optical circuit substrate on which are interconnected a slab waveguide and multiplexing waveguides more than the number of demultiplexed wavelengths, rather than laminating one waveguide-type multi/demultiplexing device substrate.

It is possible to have various other functions with flexibility, such as an optical splitting function.

Other Embodiments

Next are explained other embodiments.

Referring to FIGS. 7A-7C, in optical waveguide-type wavelength domain switch 201a, image-magnifying optical system 203a is composed of one convex lens 103 and one concave lens 90.

Referring to FIGS. 8A-8C, in optical waveguide-type wavelength domain switch 201b, image-magnifying optical system 203b is composed of one convex lens 103 and two concave lenses 91.

Referring to FIGS. 9A-9C, in optical waveguide-type wavelength domain switch 201c, image-magnifying optical system 203c is composed of one convex lens 103 and a prism pair 92 comprising plural prisms arranged at different arrangement angles.

Referring to FIGS. 10A-10C, in optical waveguide-type wavelength domain switch 201d, f-f lens (Y) 107 is composed of a composite lens 95 comprising one convex lens 94 and one concave lens 93. Also, one convex lens 94 and one concave lens 93 constituting the composite lens 95 are stuck directly to the injection surface and emission surface respectively of corner cube 108. This allows a substantial decrease of aberration in the optical system.

Figure 11:
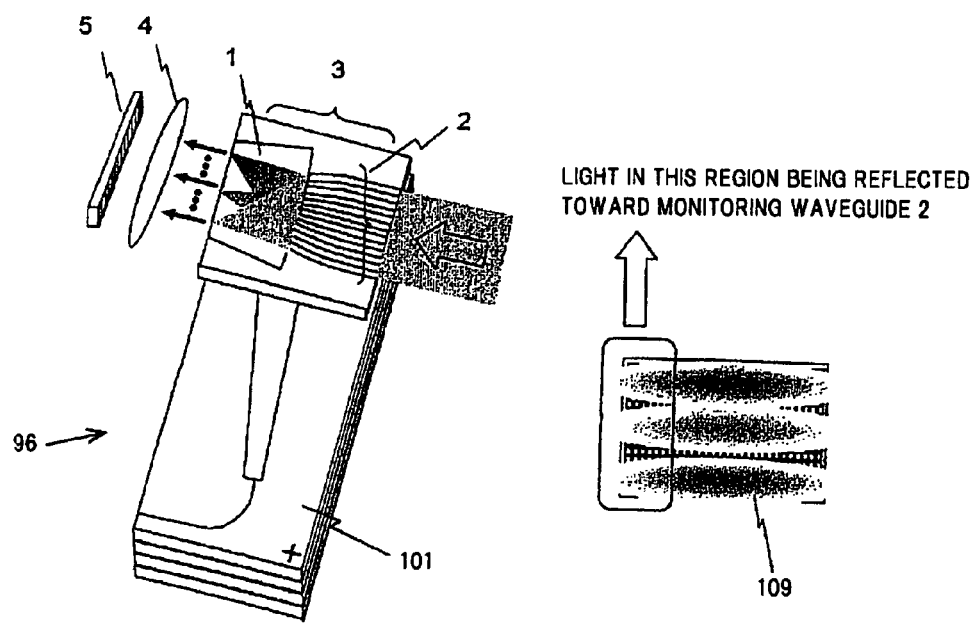
FIG. 11 is a top perspective view showing a waveguide-type multi/demultiplexing device laminate constituting a portion of an optical waveguide-type wavelength domain switch in another embodiment according to the invention.

Referring to FIG. 11, waveguide-type multi/demultiplexing device laminate 96 is constructed by forming on the top layer of the above-explained waveguide-type multi/demultiplexing device laminate 101 an optical circuit device 3 with an optical coupler formed on a substrate comprising slab waveguide 1 and monitoring demultiplex waveguide 2 comprising multiple waveguides connected to the slab waveguide 1. The monitoring demultiplex waveguide 2 outputs light more than the number of wavelengths demultiplexed by the slab waveguide 1. On the output side of the monitoring demultiplex waveguide 2 is arranged a monitoring condenser lens 4. On the output side of the monitoring condenser lens 4 is arranged a light-receiving device array 5. Light of a portion of optical phase-modulating cell 109 illustrated is reflected toward the optical coupler, thereby demultiplexing the light output from the optical coupler into each wavelength, which is converted into an electrical signal at the light-receiving device array 5. This can monitor power for each wavelength.

By incorporating the waveguide-type multi/demultiplexing device laminate 96 of FIG. 11 into the optical waveguide-type wavelength domain switch 201 of this invention, it is possible to monitor optical signal management in the module (e.g., to ensure a desired signal-to-noise ratio (SN ratio)), and therefore realize intelligent apparatus.

Referring to FIGS. 12A-12D, in optical waveguide-type wavelength domain switch 201e, instead of using the above-explained optical polarization diversity system 100, there are used 2 optical phase-modulating cells 109 and 109e, a polarized light beam splitter (polarization-splitting device) 500, and a half-wavelength plate 501 for the polarization-splitting device, to ensure polarization independence. Namely, in comparison with optical waveguide-type wavelength domain switch 201 of FIG. 1, the output of optical fiber group 110 comprising plural optical fibers is connected directly with waveguide-type multi/demultiplexing device laminate 101, not via optical polarization diversity system 100. Also, lens system 202e is provided with polarization-splitting device 500 between corner cube 108 and triangular mirror 105. On the reflected-light output side of the polarization-splitting device 500 is arranged second optical phase-modulating cell 109e arranged at right angles to optical phase-modulating cell 109. On the transmitted-light output side of the polarization-splitting device 500 is arranged half-wavelength plate 501 for the polarization-splitting device. The triangular mirror 105 faces the light output of the half-wavelength plate 501 for the polarization-splitting device.

As shown in FIG. 12D, the optical phase-modulating cell 109 operates polarized light oscillating in the arrow direction only. In the optical phase-modulating cell 109e, on the other hand, the oscillating direction is spatially at right angles to the above arrow direction. This arrangement of the optical phase-modulating cells 109 and 109e spatially at right angles is called orthogonal arrangement.

In optical waveguide-type wavelength domain switch 201e, of the light returned at the corner cube 108, the X-polarized light injected into the polarization-splitting device 500 is transmitted through the polarization-splitting device 500, converted by the half-wavelength plate 501 into Y-polarized light, reflected at the triangular mirror 105, and injected into the optical phase-modulating cell 109 mounted at the bottom (in the XZ-plane).

On the other hand, the Y-polarized light injected into the polarization-splitting device 500 is reflected at the polarization-splitting device 500, reflected at triangular mirror 105e without changing the polarized direction, and injected into the second optical phase-modulating cell 109e mounted at the bottom (in the XZ-plane). The triangular mirror 105e is arranged in the positive Y-axis direction of the second optical phase-modulating cell 109e.

It is desirable that these 2 polarized light beams have substantially the same optical path length. Taking account of the optical path length difference between the polarization-splitting device 500 and the half-wavelength plate 501, a quartz glass plate with appropriate thickness may be inserted after the polarization-splitting device 500, for the Y-polarized light reflected at the polarization-splitting device 500.

As shown in FIG. 12A, the optical waveguide-type wavelength domain switch 201e is equipped with a driving circuit/power supply as a driving source.

Figure 13:
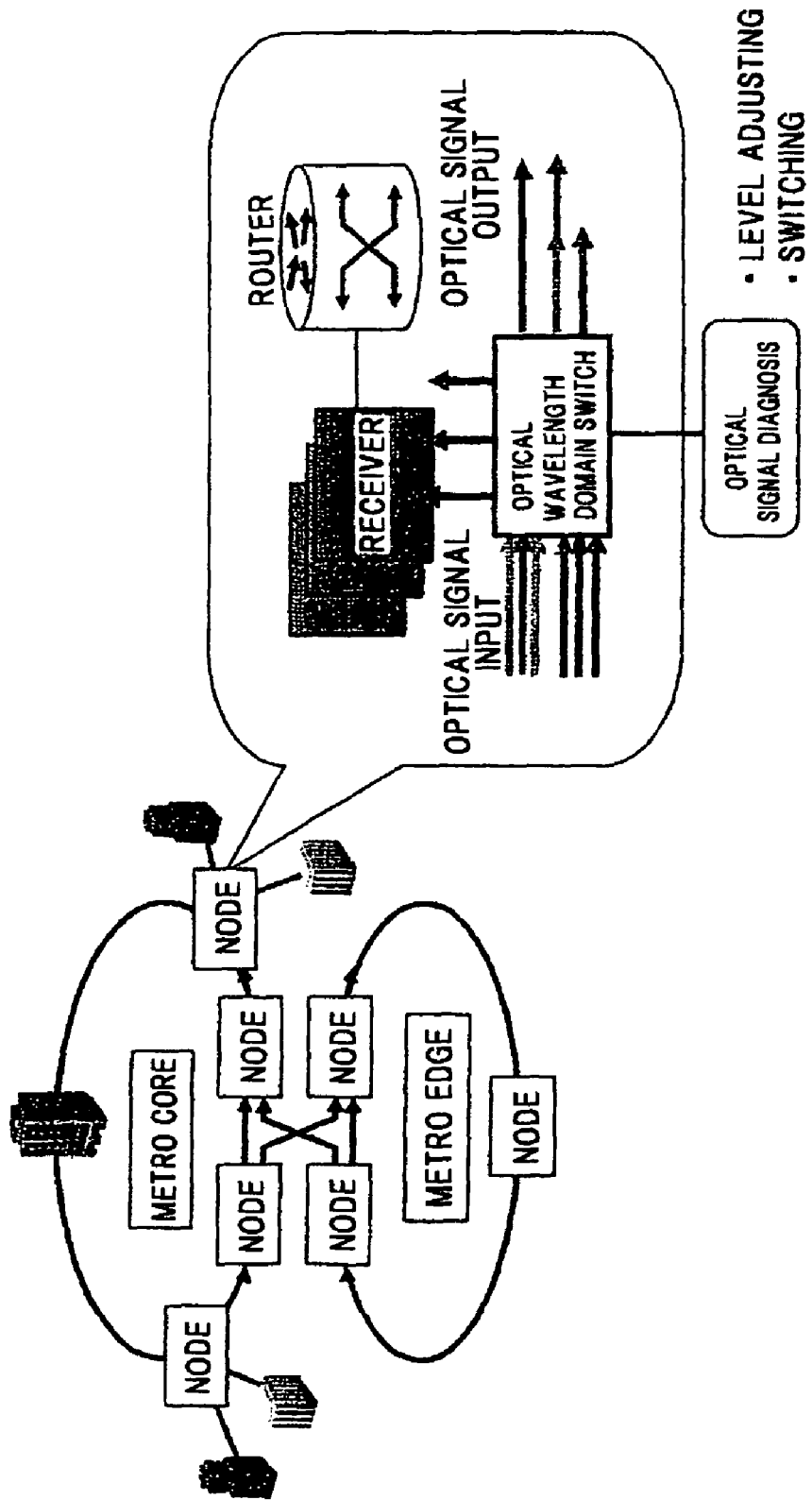
FIG. 13 is a structural diagram showing a communication network using an optical waveguide-type wavelength domain switch of the invention.

Referring to FIG. 13, the optical waveguide-type wavelength domain switch of the invention is used in each node of a communication network. Looking at one node in detail, plural incoming optical signals from outside are input into WSS (optical waveguide-type wavelength domain switch 201). The signals are output from the WSS to plural receivers in a node. Each receiver is connected with a router. Also, plural outgoing optical signals are output from the WSS to outside. The WSS is connected with optical signal diagnosis equipment for level adjusting, switching, etc.

The optical waveguide-type wavelength domain switch of the invention may be applied to general optical signal add/drop systems and optical cross-connect systems. At present, it is used in relatively large-scale systems such as trunk line systems or metro cores, but with substantial cost reduction allowed by the invention, it will be introduced into wide-range systems such as metro edges or access systems, leading to innovative development of optical network.

The invention can realize the low-cost, small-size, high-performance, flexible optical waveguide-type wavelength domain switch, therefore allowing a substantial improvement of optical systems and optical networks in the future.

Figure 16:
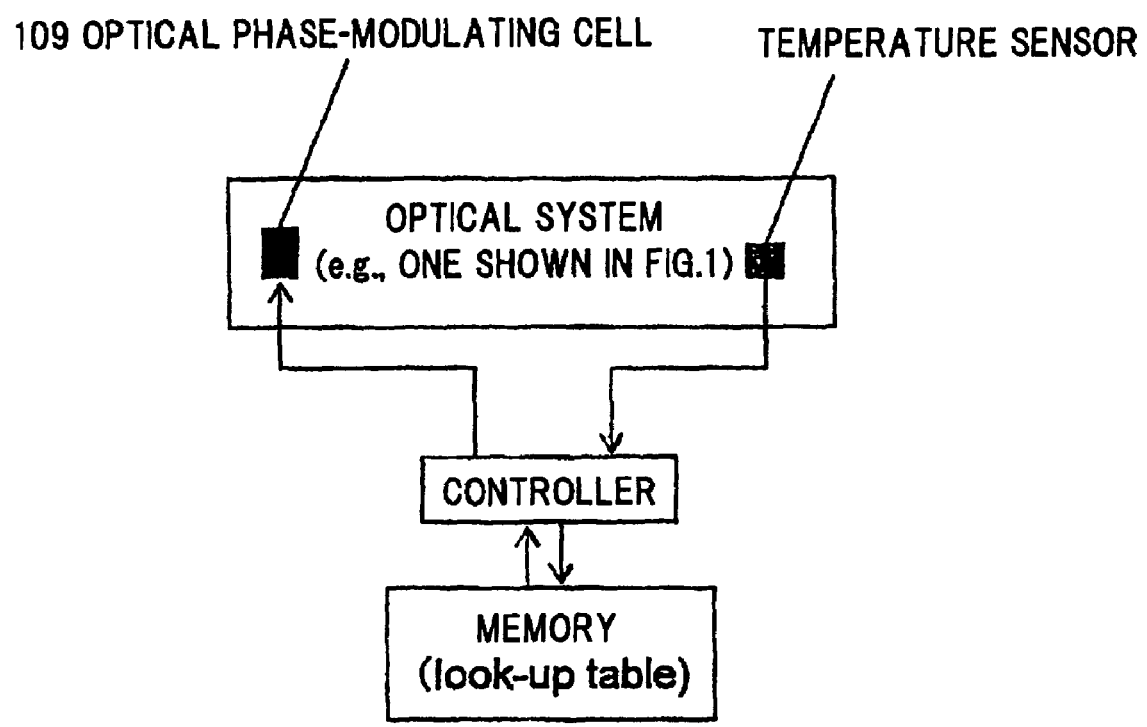
FIG. 16 is a block diagram showing an optical waveguide-type wavelength domain switch in another embodiment according to the invention.

Referring to FIG. 16, the optical waveguide-type wavelength domain switch is equipped with a temperature sensor, a memory in which demultiplex property data of the waveguide-type multi/demultiplexing device is written beforehand that varies with temperature measured using the temperature sensor, and correcting means for, based on the data, providing the optical phase-modulating cell with additional phase distribution and thereby correcting a demultiplexed wavelength deviation of the waveguide-type multi/demultiplexing devices due to temperature variation.

In general, optical phase-modulating cells have temperature dependency. Even if the optical phase-modulating cell is held at a constant temperature using peltiert device or the like, it is difficult to eliminate that effect. For this reason, the temperature sensor is disposed in the optical system (see FIGS. 1A-1C, 9A-9C, and 10A-10C) mounted with the optical phase-modulating cell, to monitor its temperature. On the other hand, the demultiplex property data for temperature measured with this temperature sensor is stored beforehand in the memory as a look-up table for correction thereof via the controller. This allows very high-precision switching performance (e.g., low-loss switching) to be achieved.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. An optical waveguide-type wavelength domain switch, comprising:
   a waveguide-type multi/demultiplexing device laminate comprising three or more laminated waveguide-type multi/demultiplexing devices;
   a lens system positioned on a demultiplex side of the waveguide-type multi/demultiplexing device laminate; and
   a reflective optical phase-modulating cell positioned on an opposite side of the waveguide-type multi/demultiplexing device laminate to the lens system,
   wherein the lens system comprises a lens alignment comprising plural lenses in one-to-one correspondence with the waveguide-type multi/demultiplexing devices and having a light-collecting or collimating function in the lens-aligning direction, an image-magnifying optical system having an N:1 (N>1) image-magnifying function arranged on the optical phase-modulating cell side of the lens alignment, an f-f lens (Y) arranged on the optical phase-modulating cell side of the image-magnifying optical system, and having a light-collecting or collimating function in the same direction as the lens-aligning direction of the lens alignment, and an f-f lens (X) having a light-collecting or collimating function in the perpendicular direction to the lens-aligning direction of the lens alignment.

2. The optical waveguide-type wavelength domain switch according to claim 1, further comprising
   an optical polarization diversity system positioned on the multiplex side of the waveguide-type multi/demultiplexing device laminate, the optical polarization diversity system comprising a lens pair comprising two lenses arranged in its optical axis and having an image-magnifying function, a polarization-splitting device arranged between the two lenses constituting the lens pair for splitting two polarized beams in mutually orthogonal polarization directions, and a half-wavelength plate arranged at a position through which one of the split polarized beams is passed on the waveguide-type multi/demultiplexing device laminate side relative to the lens pair and for rotating the polarization direction of the one polarized beam through 90°, and
   the waveguide-type multi/demultiplexing devices comprising two or more multiplexing waveguides, one of which is longer or shorter than the other, to equalize the respective optical path lengths of the two polarized beams in the same polarization direction from the optical polarization diversity system to a slab waveguide in the waveguide-type multi/demultiplexing devices.

3. The optical waveguide-type wavelength domain switch according to claim 2, wherein
   the optical polarization diversity system further comprises a quartz glass substrate with substantially the same thickness as the thickness of the half-wavelength plate and arranged at a position through which the other of the split polarized beams is passed on the waveguide-type multi/demultiplexing device laminate side relative to the lens pair.

4. The optical waveguide-type wavelength domain switch according to claim 2, wherein
   the waveguide-type multi/demultiplexing devices further comprise a specified width slit formed at an intermediate location of the longer multiplexing waveguide than the other of the two or more multiplexing waveguides, and a resin inserted in the slit for compensating for the optical path length difference between the multiplexing waveguides due to temperature variation caused by the resin having a refractive index temperature coefficient with an opposite sign to that of a refractive index temperature coefficient of material constituting the multiplexing waveguides.

5. The optical waveguide-type wavelength domain switch according to claim 1, wherein
the image-magnifying optical system of the lens system comprises one or more convex lenses and one or more concave lenses, or two or more convex lenses with mutually different focal distances, or one or more convex lenses and two or more prisms arranged at different arrangement angles.

6. The optical waveguide-type wavelength domain switch according to claim 1, further comprising:
a second optical phase-modulating cell arranged orthogonal to the optical phase-modulating cell;
a polarization-splitting device arranged between these optical phase-modulating cells and the lens system;
a half-wavelength plate for the polarization-splitting device arranged at one light output side of the polarization-splitting device and for rotating its polarization direction through 90°; and
a driving source for driving the optical phase-modulating cell and the second optical phase-modulating cell with the same control signal.

7. The optical waveguide-type wavelength domain switch according to claim 1, further comprising
a triangular corner cube between the f-f lens (Y) of the lens system and the optical phase-modulating cell, for making incident and reflected light beams parallel to each other.

8. The optical waveguide-type wavelength domain switch according to claim 7, wherein
the f-f lens (Y) is stuck to the corner cube.

9. The optical waveguide-type wavelength domain switch according to claim 7, wherein
the f-f lens (Y) comprises a composite lens comprising one convex lens and one concave lens.

10. The optical waveguide-type wavelength domain switch according to claim 9, wherein
one of the one convex lens and the one concave lens constituting the composite lens is stuck to one-side reflective surface of the corner cube, while the other is stuck to the opposite-side reflective surface of the corner cube.

11. The optical waveguide-type wavelength domain switch according to claim 7, further comprising
a triangular mirror between the corner cube and the optical phase-modulating cell, for bending an optical axis through 90°.

12. The optical waveguide-type wavelength domain switch according to claim 7, wherein
the end face of the waveguide-type multi/demultiplexing devices is formed with non-reflective coating, or ground obliquely at an angle of 6 degrees or more to a virtual plane perpendicular to the surface of the waveguide-type multi/demultiplexing devices,
the waveguide-type multi/demultiplexing devices are disposed obliquely at a predetermined angle to an incidence/emission optical axis, and
the corner cube and the optical phase-modulating cell are formed with non-reflective coating, or disposed obliquely at a constant angle or more to the surface of the waveguide-type multi/demultiplexing devices.

13. The optical waveguide-type wavelength domain switch according to claim 1, further comprising
a wedge-like demultiplexed wavelength temperature dependency-compensating cell between the waveguide-type multi/demultiplexing devices and the optical phase-modulating cell, which comprises a resin having a refractive index temperature coefficient with an opposite sign to that of a refractive index temperature coefficient of a material forming the waveguide-type multi/demultiplexing devices, and which compensates for demultiplexed wavelength temperature dependency of the waveguide-type multi/demultiplexing devices.

14. The optical waveguide-type wavelength domain switch according to claim 1, further comprising on a top layer of the waveguide-type multi/demultiplexing device laminate
an optical circuit device formed with an optical coupler comprising a slab waveguide and a monitoring demultiplex waveguide comprising multiple waveguides connected to the slab waveguide.

15. The optical waveguide-type wavelength domain switch according to claim 14, further comprising
a light-receiving device connected to the monitoring demultiplex waveguide.

16. The optical waveguide-type wavelength domain switch according to claim 1, further comprising:
a temperature sensor;
a memory in which demultiplex property data of the waveguide-type multi/demultiplexing devices is written beforehand that varies with temperature measured using the temperature sensor; and
correcting means for, based on the data, providing the optical phase-modulating cell with additional phase distribution and thereby correcting a demultiplexed wavelength deviation of the waveguide-type multi/demultiplexing devices due to temperature variation.

* * * * *